United States Patent
Yokoyama et al.

(10) Patent No.: US 6,388,049 B1
(45) Date of Patent: May 14, 2002

(54) LOW-MOLECULAR WEIGHT OXYMETHYLENE POLYMER AND COMPOSITION THEREOF

(75) Inventors: Hiroshi Yokoyama, Okayama; Yukihiro Ban, Kurashiki, both of (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 09/786,168

(22) PCT Filed: Jun. 29, 2000

(86) PCT No.: PCT/JP00/04290

§ 371 Date: Feb. 28, 2001

§ 102(e) Date: Feb. 28, 2001

(87) PCT Pub. No.: WO01/02453

PCT Pub. Date: Jan. 11, 2001

(30) Foreign Application Priority Data

Jul. 1, 1999 (JP) .......................................... 11-187380

(51) Int. Cl.[7] ...................... C08G 65/34; C08G 65/46; C08G 65/48
(52) U.S. Cl. ...................... 528/425; 528/230; 528/245; 525/398
(58) Field of Search ............................ 528/425, 230, 528/245; 525/398

(56) References Cited

U.S. PATENT DOCUMENTS

| 4,082,729 A | * | 4/1978 | Burg et al. ............... 260/67 FP |
| 4,804,716 A | * | 2/1989 | Flexman ..................... 525/399 |
| 5,248,762 A | | 9/1993 | Yamamoto et al. |
| 5,286,807 A | * | 2/1994 | Flexman ..................... 525/399 |

FOREIGN PATENT DOCUMENTS

| JP | 45-35188 B | 11/1970 |
| JP | 55-39182 B | 10/1980 |
| JP | 2-55712 A | 2/1990 |
| JP | WO 92/03487 | 3/1992 |
| JP | 6-172612 A | 6/1994 |

* cited by examiner

Primary Examiner—Duc Truong
(74) Attorney, Agent, or Firm—Pennie & Edmonds LLP

(57) ABSTRACT

A low-molecular-weight oxymethylene polymer characterized by having a straight-chain molecular structure, a number-average molecular weight of 1,000 to 8,000 and a molecular weight distribution (Mw/Mn) of 1.0 to 3.0, and containing 0 to 30 mol % of a co-monomer.

12 Claims, 1 Drawing Sheet

|   | MELTING POINT | COMONOMER CONTENT |
|---|---|---|
| D | 174.995 °C | 0% |
| E | 145 °C | 0% |
| F | 120 °C | 6% |
| G | 149.995 °C | 6% |
| H | 175 °C | 0% |
| I | 150 °C | 6% |

|   | MELTING POINT | COMONOMER CONTENT |
|---|---|---|
| D | 174.995 °C | 0% |
| E | 145 °C | 0% |
| F | 120 °C | 6% |
| G | 149.995 °C | 6% |
| H | 175 °C | 0% |
| I | 150 °C | 6% |

LOW-MOLECULAR WEIGHT OXYMETHYLENE POLYMER AND COMPOSITION THEREOF

TECHNICAL FIELD

The present invention relates to a polyoxymethylene resin modifier for prominently improving mechanical properties of the molded articles, and a polyoxymethylene resin composition containing such a ye modifier. The polyoxymethylene resin composition of the present invention is capable of easily providing molded articles having excellent mechanical properties, especially flexural modulus, Rockwell hardness and weldability as well as high chemical resistance and good visual appearance, so that it finds its way into many uses, such as parts of OA equipment, electrical and electronic devices, automobiles, etc.

BACKGROUND ART

Polyoxymethylene resin offers a good balance of mechanical properties, fatigue resistance, wear resistance, chemical resistance and moldability, and is widely utilized for molding parts of various industrial products such as automobiles, electrical and electronic devices, precision machines, building materials, piping, etc. On the other hand, there have been proposed the polyoxymethylene resin compositions in which reinforcements such as glass fiber, carbon fiber, alumina fiber, glass flakes, talc, etc., are incorporated for further improving mechanical properties (JP-A-62-91551, U.S. Pat. No. 4,806,586, etc.). However, reinforced oxymethylene polymer resins containing reinforcements such as mentioned above, as compared with non-reinforced oxymethylene polymer resins, are excessively lowered in fluidity when melted, so that when they are molded under high temperature and high injection pressure conditions, the molded articles tend to have poor appearance due to heat deterioration or discoloration of the resin. Further, orientation of the reinforcement gives rise to such problems as reduced weldability and warping of the molded articles.

It has been also proposed to add an inorganic crystal nucleating agent to oxymethylene polymers for improving mechanical properties (e. g. JP-A-47-11136). In this composition, however, the degree of improvement of mechanical properties is small in comparison with the compositions to which reinforcements were added, and the property requirements are not necessarily satisfied.

As a result of extensive studies for overcoming the above problems, the present inventors found that a polyoxymethylene resin composition obtained by incorporating a straight-chain low-molecular-weight oxymethylene polymer (A) having an unprecedentedly sharp molecular weight distribution (Mw/Mn) that falls within the range of 1.0 to 3.0 while having a number average molecular weight in the range of 1,000 to 8,000 is possessed of various excellent properties at the same time, enabling easy production of the molded articles having high-grade mechanical properties, especially flexural modulus, Rockwell hardness and weldability as well as high chemical resistance and good visual appearance.

Proposals relating to the preparation of low-molecular-weight oxymethylene polymers have been made in some patents, for example, JP-B-55-39182, JP-A-6-172612 and EP-A-708123. In these patents, however, no method is disclosed in which molecular weight distribution (Mw/Mn) is kept under 3.0. In these proposals, a large quantity of chain transfer agent is used for obtaining a desired low-molecular-weight oxymethylene polymer, and it is supposed that in order to compensate for the consequent drop of polymerizability, a batch polymerizer or a large amount of polymerization catalyst was used. According to these methods, it is impossible to obtain the polymers having Mw/Mn of not greater than 3.0, and the obtained polymers are incapable of producing the above-said outstanding effects of the present invention, such as high-grade mechanical properties, high chemical resistance and good visual appearance of the molded product.

JP-B-45-35188 discloses a method for obtaining a low-molecular-weight oxymethylene polymer by starting with paraformaldehyde. This method is also unable to produce the said effects since the molecular weight distribution (Mw/Mn) exceeds 3.0.

JP-A-2-55712 and U.S. Pat. No. 5,248,762 disclose cyclic oxymethylene polymers having a molecular weight distribution (Mw/Mn) in the range of 1.0 to 1.5 while having a number-average molecular weight in the range of 500 to 5,000. These polymers also fall short of providing the above-said effects as they have no straight-chain molecular skeleton of the polymer of the present invention.

DISCLOSURE OF INVENTION

The present invention is designed to solve the prior art problems mentioned above, and has for its object to provide a polymer resin composition which is remarkably improved in mechanical properties, especially flexural modulus, without using reinforcements, also shows good fluidity and high thermal stability when melted, and hence is capable of easily producing the molded articles with good visual appearance with no fear of impairing their weldability and anti-warping properties.

As a result of many studies conducted to solve the above problems, the present inventors found that a polyoxymethylene resin composition obtained by uniformly mixing (A) 1 to 500 parts by weight of a straight-chain low-molecular-weight oxymethylene polymer characterized by containing 0 to 30 mol % of a co-monomer having a number-average molecular weight of 1,000 to 8,000 and a molecular weight distribution (Mw/Mn) of 1.0 to 3.0 with (B) 100 parts by weight of a high-molecular-weight polyoxymethylene resin having a number-average molecular weight of 15,000 to 1,000,000 is greatly improved in mechanical properties, especially flexural modulus, without using reinforcements, also has good fluidity and thermal stability in the molten form, hence is long in critical residence time till generation of silver streaking and thus capable of easily producing the molded articles with excellent visual appearance without impairing their weldability and anti-warping properties, and on top of that, has a surprising effect of improving Rockwell hardness and chemical resistance of the molded articles.

Thus, the present invention provides:

(1) A low-molecular-weight oxymethylene polymer having a straight-chain molecular structure, a number-average molecular weight of 1,000 to 8,000 and a molecular weight distribution (Mw/Mn) of 1.0 to 3.0, and containing 0 to 30 mol % of a co-monomer unit.

(2) A low-molecular-weight oxymethylene polymer described in (1) above, wherein the content of the co-monomer unit is 0 to 0.8 mol %.

(3) A low-molecular-weight oxymethylene polymer described in (1) or (2) above, wherein the content of the comonomer unit and the melting point of the polymer fall in the region defined by DEFG of FIG. 1.

(4) A low-molecular-weight oxymethylene polymer described in any one of (1) to (3) produced by continuous bulk polymerization reaction using as starting materials a monomer or a mixture of a monomer and a co-monomer, and a molecular weight modifier in an amount of 0.1 to 1 mole per 1 kg of said monomer or said mixture of a monomer and a co-monomer, and also using a cationic polymerization initiator as polymerization catalyst in an amount of 0.00001 to 0.0001 mole per 1 mole of said starting materials.

(5) A polyoxymethylene resin composition comprising (A) 1 to 500 parts by weight of a low-molecular-weight oxymethylene polymer described in any one of (1) to (4) above and (B) 100 parts by weight of a high-molecular weight polyoxymethylene resin having a number-average molecular weight of 15,000 to 1,000,000 and selected from the group consisting of (B-1) oxymethylene homopolymer resin, (B-2) oxymethylene copolymer resin, (B-3) oxymethylene block copolymer resin and a mixture thereof.

(6) A polyoxymethylene resin composition described in (5) above wherein the content of the low-molecular-weight oxymethylene polymer (A) is 10 to 100 parts by weight.

(7) A polyoxymethylene resin composition described in (5) or (6) above wherein the high-molecular-weight polyoxymethylene resin (B) is an oxymethylene copolymer resin (B-2) having a melting point of 167 to 171° C.

(8) A polyoxymethylene resin composition described in any one of (5) to (7) above wherein the polyoxymethylene resin composition contains 1 to 10,000 ppm of a crystal nucleating agent.

(9) A process for continuously producing a polyoxymethylene resin composition described in any one of (5) to (8) above, which comprises the steps of producing a crude polymer of the low-molecular-weight oxymethylene polymer (A) and a crude polymer of the high-molecular-weight polyoxymethylene resin (B) simultaneously by the separate polymerizers by using equipment consisting of at least two continuous bulk polymerizers connected in parallel and an extruder disposed successively thereto, blending 100 parts by weight of said crude polymer of the high-molecular-weight polyoxymethylene resin (B) and 1 to 500 parts by weight of said crude polymer of the low-molecular-weight oxymethylene polymer (A) while deactivating the polymerization catalyst, and continuously and uniformly melting and mixing said crude polymers while conducting a terminal stabilization treatment on said crude polymers by said extruder.

(10) A process for continuously producing a polyoxymethylene resin composition described in any one of (5) to (8) above, which comprises the steps of polymerizing a monomer or a mixture of a monomer and a co-monomer and a molecular weight modifier with a cationic polymerization initiator as polymerization catalyst by using one or two or more continuous bulk polymerizers connected in series, and further carrying out polymerization by adding to the resulting polymerization product said monomer or said mixture of a monomer and a comonomer and said molecular weight modifier in a state not causing deactivation of said cationic initiator so that the amount of the obtained low-molecular-weight oxymethylene polymer will become 1 to 500 parts by weight per 100 parts by weight of the high-molecular-weight polyoxymethylene resin.

(11) A process for continuously producing a polyoxymethylene resin composition described in any one of (5) to (8) above, which comprises the steps of producing a crude polymer of the low-molecular-weight oxymethylene polymer (A) and a crude polymer of the high-molecular-weight polyoxymethylene resin (B) simultaneously by the separate polymerizers using formaldehyde and a molecular weight modifier as starting materials and also using an onium salt-based polymerization catalyst by using a series of equipment consisting of at least two slurry polymerizers connected in series or parallel, a terminal stabilizing device and an extruder disposed successively, blending 100 parts by weight of said crude polymer of the high-molecular-weight polyoxymethylene resin (B) and 1 to 500 parts by weight of said crude polymer of the low-molecular weight oxymethylene polymer (A) while deactivating and removing the polymerization catalyst, blocking the unstable terminals of the obtained polymer, and continuously conducting uniform melting and mixing by the extruder.

(12) Parts of OA equipment, music, video and information devices, communications apparatus, electrical and electronic devices, toys, sports equipment, furniture, housing equipment or automobiles, obtained by molding a polyoxymethylene resin composition described in any one of (5) to (8) above.

BEST MODE FOR CARRYING OUT THE INVENTION

Figure 1:
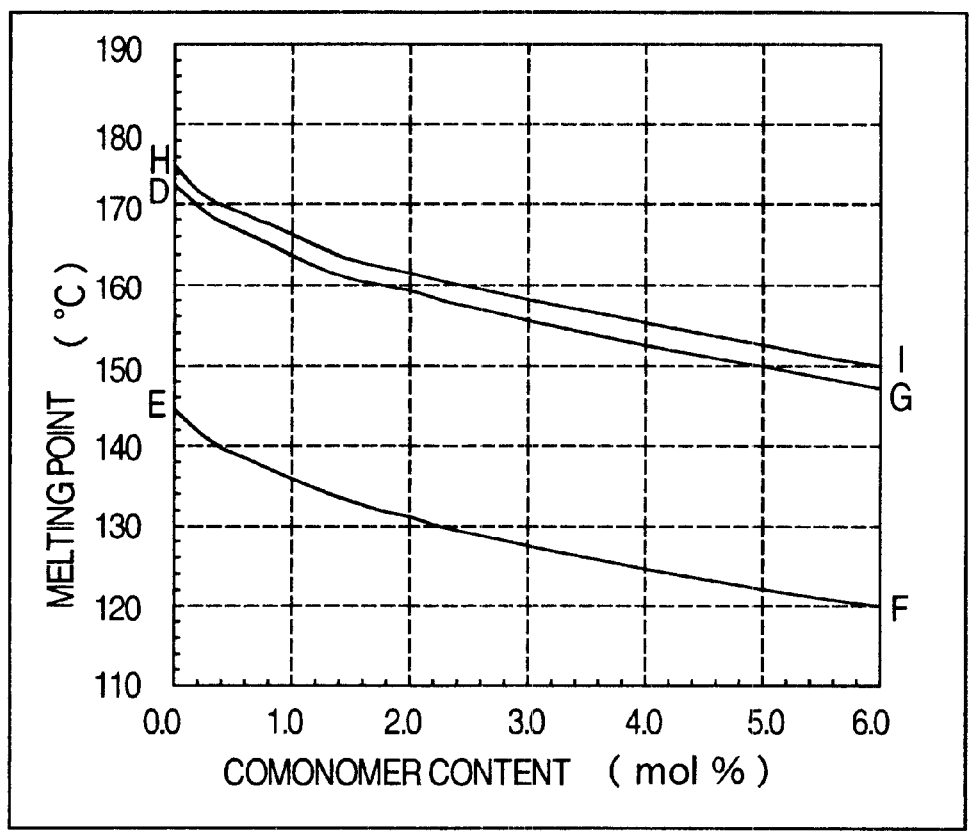
FIG. 1 shows the relation between co-monomer content and melting point of the low-molecular-weight oxymethylene polymer of the present invention. Segment HI shows the melting point relative to co-monomer content of an oxymethylene polymer (C) having a number-average molecular weight of 30,000 to 100,000 which contains a co-monomer of the same type and same content as in the low-molecular-weight oxymethylene polymer (A) of the present invention and which was produced by the same method as (A). Segment DG represents a parallel movement of the segment HI toward the low melting point side by a distance corresponding to 0.005° C. in the direction of the vertical axis, and segment EF represents a similar movement of the segment HI by a distance corresponding to 30° C. in the direction of the vertical axis. In the present invention, the preferred range of co-monomer content and melting point is in the region defined by DEFG.

The low-molecular-weight oxymethylene polymers (A) used in the present invention include oxymethylene homopolymers substantially composed of oxymethylene units, produced by using as starting material formaldehyde or a cyclic oligomer such as trioxane, which is a trimer of formaldehyde, or tetraoxane which is a tetramer of formaldehyde; and oxymethylene copolymers containing the above-mentioned starting material and a co-monomer selected from the e-group consisting of cyclic ethers having 2 or more carbon atoms in the molecule, such as ethylene oxide, propylene oxide, 1,3-dioxolane, 1,3-propanediol formal, 1,4-butanediol formal, 1,5-pentanediol formal, 1,6-hexanediol formal, diethylene glycol formal, 1,3,5-trioxepane, 1,3,6-trioxocane, etc., and mixtures thereof. The polymers (A) are also characterized by having a straight-chain structure blocked by an ester group or ether group at the end of the molecule.

Incorporation of a co-monomer such as mentioned above is conducive to the further improvement of thermal stability of the low-molecular-weight oxymethylene polymer (A), but it should be noted that an excess content thereof reduces the mechanical properties improving effect envisaged in the present invention.

If the content of the co-monomer is expressed by molar ratio of the oxyalkylene units with a carbon number of 2 or more to the methylene oxide units, the co-monomer content needs to fall in the range of 0 to 30 mol %, preferably 0 to 10 mol %, more preferably 0 to 6 mol %, even more preferably 0 to 3 mol %, still more preferably 0 to 1.9 mol %, most preferably 0 to 0.8 mol %.

The co-monomer content and melting point of the low-molecular-weight oxymethylene polymer (A) according to the present invention preferably lie in the region defined by DEFG in FIG. 1. The horizontal axis in FIG. 1 represents co-monomer content of the oxymethylene polymer and the vertical axis represents melting point of the oxymethylene polymer. FIG. 1 shows the data obtained in case 1,3-dioxolane was used as co-monomer, but preferability of the region defined by DEFG in FIG. 1 also applies where other types of co-monomer are used. Segment HI in FIG. 1 shows the change of melting point with co-monomer content of an oxymethylene polymer (C) having a number-average molecular weight of 30,000 to 100,000 which contains a co-monomer of the same type and same content as in the low-molecular weight oxymethylene polymer (A) of the present invention and produced by the same method as (A). Segment DG represents a parallel movement of the segment HI toward the low melting point side by a distance corresponding to 0.005° C. in the direction of vertical axis, and the segment EF represents a similar movement of the segment HI by a distance corresponding to 30° C. in the direction of vertical axis. In case the melting point relative to co-monomer content of the low-molecular-weight oxymethylene polymer (A) is in the higher temperature region than defined by the segment DG, it is highly probable that the co-monomer be not copolymerized randomly, giving rise to the problem in thermal stability of the low-molecular-weight oxymethylene polymer (A). On the other hand, in case the melting point relative to co-monomer content of the low-molecular-weight oxymethylene polymer (A) lies in the lower temperature region than defined by the segment EF, the mechanical properties improving effect of the polymer envisaged in the present invention is lessened.

The melting point of the low-molecular-weight oxymethylene polymer (A) according to the present invention preferably falls within the range of 126 to 175° C.

Besides the above-said conditions, the low-molecular-weight oxymethylene polymer (A) of the present invention needs to meet the requirement that both its number-average molecular weight and molecular weight distribution (Mw/Mn) stay within the specified ranges.

It is necessary that the number-average molecular weight of the polymer (A) is within the range of 1,000 to 8,000. If it is greater than 8,000, there cannot be obtained the desired effect of increasing crystallinity when the oxymethylene polymer is used as modifier. If the number-average molecular weight is less than 1,000, the mechanical properties, especially elongation, of the molded article deteriorates. The more preferred range of number-average molecular weight of the polymer (A) is 1,500 to 7,000, even more preferably 2,000 to 6,000, most preferably 2,500 to 5,000.

It is also necessary that the molecular weight distribution (Mw/Mn) of the polymer (A) is within the range of 1.0 to 3.0. In the production of the low-molecular weight oxymethylene polymers such as the one (A) according to the present invention, a greater amount of molecular weight modifier than usually used is needed, so that the polymerization catalyst activity lowers more than observed in the production of the ordinary oxymethylene polymers. Especially when it is tried to produce a low-molecular-weight oxymethylene polymer using a batch type bulk polymerizer, the polymerization system tends to become non-uniform, making it difficult to produce a polymer having a molecular weight distribution (Mw/Mn) of not greater than 3.0. The low-molecular-weight oxymethylene polymers whose molecular weight distribution exceeds 3.0 are poor in heat stability and also their molded articles are unsatisfactory in mechanical properties and appearance. For example, JP-B-55-39182 describes the low-molecular-weight oxymethylene polymers having a melt index of around 300. However, those polymers are produced by batch type bulk polymerization, and when a follow-up test was carried out according to the description of the patent, there were obtained only the low-molecular-weight oxymethylene polymers whose molecular weight distribution (Mw/Mn) was 3.3 to 3.6, and the polyoxymethylene resin composition obtained by mixing such a polymer with a high-molecular-weight polyoxymethylene resin (B) was not only incapable of producing an appreciable effect of improving the mechanical properties of the molded articles like the composition of the present invention, but was also poor in heat stability when melted and impaired visual appearance of the molded articles. The more preferred range of molecular weight distribution (Mw/Mn) is 1.0 to 2.7, even more preferably 1.0 to 2.5, most preferably 1.0 to 2.3.

There are known the cyclic oxymethylene polymers having a number-average molecular weight in the range of 500 to 5,000 and a molecular weight distribution (Mw/Mn) in the range of 1.0 to 2.0 and their production methods (e.g. JP-A-2-55712), but the polyoxymethylene resin compositions prepared by mixing the cyclic oxymethylene polymers obtained from the method of the above patent with a high-molecular-weight polyoxymethylene resin (B) were unable to produce a satisfactory effect in improving the mechanical properties of the molded articles as the compositon of the present invention did. This is considered to be due to heterogeneity or insufficient crystallinity of the molded article resulting from the difference of molecular skeleton of the cyclic oxymethylene polymers from that of the high-molecular-weight polyoxymethylene resin (B), but a more definite explanation is yet to be given.

The low-molecular-weight oxymethylene polymer (A) of the present invention can be produced by subjecting a monomer and if necessary a co-monomer to a continuous bulk polymerization reaction with a cationic polymerization initiator and a molecular weight modifier. The production method, however, is not restricted as long as it is capable of satisfying the requirement that the number-average molecular weight of the produced polymer stays within the range of 1,000 to 8,000 while the molecular weight distribution (Mw/Mn) remains within the range of 1.0 to 3.0. But a method is preferred in which a mixture of a monomer and a co-monomer, and a molecular weight modifier of an amount of 0.1 to 1 mole per 1 kg of said mixture are used as starting materials, and they are polymerized by a continuous bulk polymerizer using a cationic polymerization initiator as a polymerization catalyst.

Examples of the cationic polymerization initiators usable in the present invention include halides of Lewis acids, especially boric acid, tin, titanium, phosphorus, arsenic, antimony and the like, such as boron trifluoride, tin tetrachloride, titanium tetrachloride, phosphorus pentachloride, phosphorus pentafluoride, arsenic pentachloride, antimony pentafluoride, and their complex compounds or salts; protonic acids such as trifluoromethanesulfonic acid and perchloric acid; esters of protonic acids, especially esters of perchloric acid and lower aliphatic alcohols; anhydrides of protonic acids, especially mixed anhydrides of perchloric acid and lower aliphatic carboxylic acids; and isopoly acid, heteropoly acid, triethyloxonium hexafluorophosphate, triphenylmethyl hexafluoroarsenate, acetyl hexafluoroborate and the like. Use of a boron trifluoride diethyl ether or a boron trifluoride di-n-butyl ether in an amount of 0.00001 to 0.0001 mole per 1 mole of the polymerization starting materials is especially preferred. Use of an insufficient amount of cationic initiator results in reduced polymerization yield and poor economy, while use of the initiator in an excess amount may cause production of a polymer (A) whose molecular weight distribution (Mw/Mn) exceeds 3.0. In the case of using boron trifluoride diethyl ether or boron trifluoride di-n-butyl ether as cationic initiator, its amount used is preferably 0.00001 to 0.00008 mole, more preferably 0.00001 to 0.00005 mole.

In the present invention, a low-molecular-weight compound capable of serving as a chain transfer agent for cationic polymerization is used as a molecular weight modifier. Preferred examples of such molecular weight modifiers for use in the present invention are dialkylacetals of formaldehyde in which the alkyl group is a lower aliphatic alkyl group such as methyl, ethyl, propyl, isopropyl, butyl or the like, and their oligomers, alkylene glycols having a molecular weight of not greater than 3,000 such as polyethylene glycol and polypropylene glycol, and lower aliphatic alcohols such as methanol, ethanol, propanol, isopropanol and butanol. Such a molecular weight modifier is used in an amount of 0.1 to 1 mole per 1 kg of the monomer/comonomer mixture.

Purity of the molecular weight modifier is preferably not lower than 93%, more preferably not lower than 95%, even more preferably not lower than 97%, still more preferably not lower than 98%, most preferably not lower than 99%. In the case of using a methylal as a molecular weight modifier, it is necessary that the content of methyl formate therein is not greater than 7%, more preferably not greater than 5%, even more preferably not greater than 3%, still more preferably not greater than 2%, most preferably not greater than 1%.

As the polymerizer used for carrying out the continuous bulk polymerization reaction, it is possible to use kneaders, double-screw continuous extruder/kneaders, self-cleaning type extruder/mixers such as double-screw continuous paddle mixers, and other conventional continuous polymerizers for trioxane and like materials. Use of such a continuous bulk polymerizer in combination with said cationic initiator and molecular weight modifier made it possible for the first time to produce a low-molecular-weight oxymethylene polymer (A) having a number-average molecular weight in the range of 1,000 to 8,000 and a molecular weight distribution (Mw/Mn) in the range of 1.0 to 3.0. The fact that the process of the present invention can provide a uniform polymerization system and is capable of producing a low-molecular-weight oxymethylene polymer (A) having a molecular weight distribution (Mw/Mn) of 1.0 to 3.0 although using a large quantity of molecular weight modifier may be attributed to high stirring performance of the continuous polymerizer, but the more accurate mechanism is yet to be clarified.

Deactivation of the polymerization catalyst contained in the crude oxymethylene polymer obtained from the continuous bulk polymerization reaction using a cationic initiator is effectuated by putting the crude oxymethylene polymer into an aqueous solution containing a catalyst neutralizer/deactivaor, for example, an amine such as ammonia, ethylamine, tri-n-butylamine, etc., a quaternary ammonium compound, a hydroxide of an alkaline metal or alkaline earth metal, an inorganic acid salt or an organic acid salt, and/or an organic solvent, filtering the solution and drying the filtrate. As the catalyst neutralizer/deactivator, preferably a quaternary ammonium compound is used alone or in combination with another type of catalyst deactivator such as mentioned above, in which case neutralization of the catalyst can be accomplished more effectively. It is also possible to employ a method in which the crude oxymethylene polymer is brought into contact with vapor of ammonia, triethylamine or the like to deactivate the catalyst, or a method in which the crude oxymethylene polymer is contacted with at least one hindered amine, triphenylphosphine, calcium hydroxide and quaternary ammonium compounds by a mixer to deactivate the catalyst.

As the method for terminal stabilization treatment of the crude oxymethylene polymer after catalyst deactivation, it is possible to employ, for example, a method in which the volatiles are removed from the molten oxymethylene polymer by, for instance, a double-screw extruder which is capable of continuously conducting the terminal stabilizing operation consisting of at least two steps: (1) injecting a basic substance into the molten polymer and then kneading the mixture, and (2) releasing the vapor of said injected basic substance and free formaldehyde. As said basic substance, nitrogen compounds such as ammonia, triethylamine, tributylamine, quaternary ammonium compounds represented by the following formula (1), and the like can be used. Water may be present with the basic substance.

$$[R^1R^2R^3R^4N^+]_nX^{-n} \qquad (1)$$

wherein $R^1$, $R^2$, $R^3$ and $R^4$ represent independently a non-substituted or substituted alkyl group having 1 to 30 carbon atoms; an aryl group having 6 to 20 carbon atoms; an aralkyl group in which the non-substituted or substituted alkyl group of 1 to 30 carbon atoms is substituted with at least one aryl group of 6 to 20 carbon atoms; or an alkylaryl group in which the aryl group of 6 to 20 carbon atoms is substituted with at least one non-substituted or substituted alkyl group having 1 to 30 carbon atoms. The non-substituted or substituted alkyl group is straight-chain, branched or cyclic. The substituent of said substituted alkyl group is halogen, hydroxyl, aldehyde, carboxyl, amino or amide. In said non-substituted alkyl group, aryl group, aralkyl group and alkylaryl group, the hydrogen atom may be substituted with a halogen. n is an integer of 1 to 3, and X represents a hydroxyl group or a residue of a carboxylic acid of 1 to 20 carbon atoms, a hydroacid other than hydrogen halide, oxo acid, an inorganic thio-acid or an organic thio-acid having 1 to 20 carbon atoms.

As the quaternary ammonium compound, it is possible to use any of those represented by the formula (1), but it is desirable that $R^1$, $R^2$, $R^3$ and $R^4$ in the formula (1) represent independently an alkyl group having 1 to 5 carbon atoms or a hydroxyl group having 2 to 4 carbon atoms, and it is especially preferred that at least one of $R^1$ to $R^4$ is a hydroxyethyl group. More specifically, examples of such quaternary ammonium compounds include hydroxides such as tetramethylammonium, tetraethylammonium, tetrapropylammonium, tetra-n-butylammonium, cetyltrimethylammonium, tetradecyltrimethylammonium, 1,6-hexamethylenebis(trimethylammonium), decamethylene-bis-(trimethylammonium), trimethyl-3-chloro-2-hydroxypropylammonium, trimethyl(2-hydroxyethyl)ammonium, triethyl(2-hydroxyethyl) ammonium, tripropyl(2-hydroxyethyl)ammonium, tri-n- butyl(2-hydroxyethyl)ammonium, trimethylbenzylammonium, triethylbenzylammonium tripropylbenzylammonium, tri-n-butylbenzylammonium, trimethylphenylammonium, triethylphenylammonium, trimethyl-2-oxyethylammonium, monomethyltrihydroxyethylammonium, monoethyltrihydroxyethylammonium, octadecyltri(2-hydroxyethyl)ammonium, tetrakis (hydroxyethylammonium); hydro-acid salts with hydrochloric acid, hydro-acid bromide, hydro-acid fluoride, etc.; oxoacid salts with sulfuric acid, nitric acid, phosphoric acid, carbonic acid, boric acid, chloric acid, iodic acid, silicic acid, perchloric acid, chlorous acid, hypochlorous acid, chlorosulfuric acid, amidosulfuric acid, disulfuric acid, tripolyphosphoric acid, etc.; thio-acid salts with thiosulfuric acid, etc.; and carboxylic acid salts with formic acid, acetic acid, propionic acid, butanoic acid, isobutyric acid, pentanoic acid, caproic acid, caprylic acid, capric acid, benzoic acid, oxalic acid, etc. Of these compounds, hydroxides ($OH^-$), sulfates ($HSO_4^-$, $SO_4^{2-}$), carbonates ($HCO_3^-$, $CO_3^-$), borates ($B(OH)_4^-$) and carboxylates are preferred. Among the carboxylates, formates, acetates and propionates are especially preferred. These quaternary ammonium compounds may be used either singly or as a mixture comprising two or more of them. It is also possible to use a known unstable terminal kicker such as ammonia or an amine (e.g. triethylamine) in addition to said quaternary ammonium compound.

Another method for producing the low-molecular-weight oxymethylene polymer (A) of the present invention is a known slurry method, for example, the method described in JP-B-47-6420 or JP-B-47-10059, in which formaldehyde and a known molecular weight modifier are used as starting materials, and they are polymerized using a known onium salt-based polymerization catalyst and a hydrocarbon or the like as solvent.

The onium salt-based polymerization catalyst used in the above method is represented by the following formula (2):

wherein $R^1$, $R_2$, $R_3$ and $R_4$ represent independently an alkyl group; M represents an element having lone pair of electrons; and X represents a nucleophilic group.

Among the onium salt-based polymerization catalysts represented by the formula (2), quaternary ammonium salt-based compounds and quaternary phosphonium salt-based compounds are preferably used. Tetramethylammonium bromide, dimethyldistearylammonium acetate, tetraethylphosphonium iodide and tributylethylphosphonium iodide are more preferred.

As the method for blocking the terminal of the molecular chain of said polymer with an ether group, a method such as that described in JP-B-63-452 is usable, and as the method for blocking the terminal with an acetyl group, there are known a method in which the operation is carried out in a slurry state using a large amount of an acid anhydride (U.S. Pat. No. 3,459,709) and a method in which the operation is conducted in a gaseous phase using gas of an acid anhydride (U.S. Pat. No. 3,172,736). Any suitable method may be used in the present invention. The etherifying agent used for blocking the terminal with an ether group is selected from orthoesters, usually those of aliphatic or aromatic acids and aliphatic, alicyclic or aromatic alcohols, for example, methyl or ethyl orthoformate, methyl or ethyl orthoacetate and methyl or ethyl orthobenzoate, and orthocarbonates such as ethyl orthocarbonate. It is recommended to carry out the etherification reaction by introducing a Lewis acid type catalyst, for example, a moderate-strength organic acid such as p-toluenesulfonic acid, acetic acid or hydrobromic acid or a moderate-strength mineral acid such as dimethyl and diethyl sulfate, in an amount of 0.001 to 0.02 part by weight per 1 part by weight of the etherifying agent. As the solvent for the etherification reaction, there is preferably used an organic solvent, for example, a low-boiling-point aliphatic, alicyclic or aromatic hydrocarbon such as pentane, hexane, cyclohexane and benzene, or a halogenated lower aliphatic compound such as methylene chloride, chloroform and carbon tetrachloride. As the organic acid anhydride used for esterification when blocking the polymer terminal with an ester group, those represented by the following formula (3) can be used:

wherein $R_5$ and $R_6$ may be same or different and represent independently an alkyl group.

Among the organic acid anhydrides represented by the formula (3), propionic anhydride, benzoic acid anhydride, acetic acid anhydride, succinic anhydride, maleic anhydride, glutaric anhydride, phthalic anhydride and the like are preferred, acetic acid anhydride being most preferred. These organic acid anhydrides may be used alone or, if necessary, as a mixture of two or more of them. In the method where ester group blockage is effected in a gaseous phase, if the onium salt-based polymerization catalyst remains in the polymer resin, this catalyst accelerates decomposition reaction of the polymer when the end blockage is made, resulting in a greatly reduced polymer yield while causing tinting of the polymer. Therefore, it is recommended to conduct end blockage after removing the onium salt-based polymerization catalyst according to the method of JP-A-11-92542.

It is desirable that the concentration of terminal hydroxyl group be reduced to a level below 1 mol % by blocking polymer terminal with an ether group and/or an ester group. If the terminal hydroxyl group concentration exceeds 1 mol %, thermal stability of the polymer is impaired and its molded products are not provided with satisfactory weldability, chemical resistance, etc. The more preferred terminal hydroxyl group concentration is lower than 0.99 mol %, even more preferably lower than 0.98 mol %, most preferably lower than 0.97 mol %.

The polyoxymethylene resin composition obtained by mixing 1 to 500 parts by weight of the low-molecular-weight oxymethylene polymer (A) of the present invention with 100 parts by weight of a high-molecular-weight polyoxymethylene resin (B) having a umber-average molecular weight of 15,000 to 1,000,000 is remarkably improved in mechanical strength, especially in flexural modulus, without using any reinforcement and also excels in fluidity and thermal stability in the molten form, so that this composition is capable of providing the molded articles with good visual appearance.

The high-molecular-weight polyoxymethylene resin (B) used in the present invention is not specified by its molecular structure and can be selected from the group consisting of oxymethylene homopolymer resins (B-1), oxymethylene copolymer resins (B-2), oxymethylene block copolymer resins (B-3) and a mixture thereof.

The oxymethylene homopolymer resins (B-1) are the polymers having an oxymethylene group on the backbone, with both ends of the polymer chain being blocked with an ester group or an ether group. These resins can be obtained by using formaldehyde and a known molecular weight modifier as starting materials and polymerizing them using a known onium salt-based polymerization catalyst and a hydrocarbon or the like as solvent, according to a known slurry method, for example, the method described in JP-B-47-6420 or JP-B-47-10059. As for the onium salt-based polymerization catalyst used for the preparation of said resin (B-1) and the method for blocking the polymer terminal with an ether or ester group, those employed in the production of the low-molecular-weight oxymethylene polymer (A) described above can be applied.

The oxymethylene copolymer resins (B-2) can be produced according to a conventional method such as the one described in U.S. Pat. No. 2998409, by using, as the main monomer, formaldehyde or a cyclic oligomer such as trioxane, which is a trimer of formaldehyde, or tetraoxane which is a tetramer of formaldehyde, and a co-monomer copolymerizable therewith selected from cyclic ether compounds having oxyalkylene units with two or more carbon atoms in the molecule, such as ethylene oxide, propylene oxide, 1,3-dioxolane, 1,3-propanediol formal, 1,4-butanediol formal, 1,5-pentanediol formal, 1,6-hexanediol formal, diethylene glycol formal, 1,3,5-trioxepane, 1,3,6-trioxocane, etc., mono- or di-glycidyl compounds capable of forming a branched or crosslinked molecular structure, and a mixture thereof. When the content of the co-monomer is expressed by the molar ratio of oxyalkylene units with a carbon number of 2 or greater to methylene oxide units, it is necessary that the co-monomer content falls within the range of 0.1 to 30 mol %, preferably 0.2 to 5 mol %, more preferably 0.3 to 2 mol %, most preferably 0.3 to 0.8 mol %.

The melting point of the oxymethylene copolymer resins (B-2) is preferably 150 to 173° C., more preferably 162 to 171° C., most preferably 167 to 171° C. It can be adjusted by changing the co-monomer content.

Said oxymethylene copolymer resins (B-2) can be produced by using, beside the said starting materials, a known molecular weight modifier, for example, dialkylacetal of formaldehyde and its oligomers in which the alkyl group is a lower aliphatic alkyl group such as methyl, ethyl, propyl, isopropyl, butyl, etc., or lower aliphatic alcohol such as methanol, ethanol, propanol, isopropanol, butanol, etc., and a known polymerization catalyst, for example, halides of Lewis acids, especially boric acid, tin, titanium, phosphorus, arsenic and antimony, such as boron trifluoride, tin tetrachloride, titanium tetrachloride, phosphorus pentachloride, phosphorus pentafluoride, arsenic pentafluoride and antimony pentafluoride, and their complex compounds or salts; protonic acids such as trifluoromethanesulfonic acid and perchloric acid; esters of protonic acids, especially esters of perchloric acid and lower aliphatic alcohols; anhydrides of protonic acids, especially mixed anhydrides of perchloric acid and lower aliphatic carboxylic acids; isopoly acids, heteropoly acids, triethyloxonium hexafluorophosphate, triphenylmethyl hexafluoroarsenate, acetylhexafluoroborate, etc., by using a batch type reactor with a stirrer and a self-cleaning type extruder/mixer such as continuous kneader, double-screw continuous extruder/kneader, double-screw paddle type continuous mixer, or other conventional polymerizers for trioxane or the like.

For deactivation of the polymerization catalyst contained in the crude oxymethylene polymer and terminal stabilization of the crude oxymethylene polymer after deactivation, the methods employed in the preparation of the low-molecular-weight oxymethylene polymer (A) described above can be used.

The oxymethylene block copolymer resins (B-3) are the linear polymers comprising recurring oxymethylene units such as those described in JP-A-3-79618, which include polyacetal polymers in which one terminal end of the molecular chain is blocked with an alkylene oxide compound, a-b or a-b-a polyacetal block copolymers consisting of polyoxymethylene segment (a) and polymethylene segment (b) described in JP-A-4-306215, and mixtures thereof. The oxymethylene block copolymer resins (B-3) may be used singly or may be incorporated with a known lubricant. Examples of the lubricants usable here include alcohols, ethers, alkylene oxide adducts of alcohols, alkylene oxide adducts of carboxylic acids, ether-terminated polyalkylene oxide, polyalkylene glycol oils such as diesters of polyalkylene oxide and carboxylic acids, diester oils such as 1,4-butanediol laurate and diisodecyl adipate, polyolefin oils such as liquid low-molecular-weight polyolefin and hydroxypolyolefin, silicone oil and fluorine oil.

In the present invention, the number-average molecular weight of the high-molecular-weight polyoxymethylene resin (B) needs to be within the range of 15,000 to 1,000,000. If the number-average molecular weight is less than 15,000, the molded product proves to be poor in mechanical properties, especially in elongation. On the other hand, if the number-average molecular weight exceeds 1,000,000, the difference in melt viscosity between the resin (B) and the low-molecular-weight oxymethylene polymer (A) is enlarged, making it difficult to mix them homogeneously. The preferred range of number-average molecular weight is 20,000 to 500,000, more preferably 30,000 to 200,000.

In the present invention, the mixing ratio of low-molecular-weight oxymethylene polymer (A) to high-molecular-weight polyoxymethylene resin (B) (A/B) is 1~500/100 in parts by weight. If the mixing ratio is less than 1 part by weight, the produced effect as a modifier is unsatisfactory, and if the ratio exceeds 500 parts by weight, the mechanical properties, especially elongation, of the molded products are deteriorated. The preferred range of the mixing ratio is 5 to 300, more preferably 10 to 200, most preferably 10 to 100 in parts by weight.

Two or more low-molecular-weight oxymethylene polymers (A) differing in number-average molecular weight and molecular weight distribution (Mw/Mn) from each other may be mixed with a high-molecular-weight polyoxymethylene resin (B), provided that the number-average molecular weights of these polymers (A) fall within the range of 1,000 to 8,000 and also their molecular weight distrubutions (Mw/Mn) fall within the range of 1.0 to 2.5.

In carrying out the present invention, the time of mixing the low-molecular-weight oxymethylene polymer (A) and the high-molecular-weight polyoxymethylene resin (B) is not specified; they may be mixed at any suitable stage of the production process, for example, after polymerization, after terminal stabilization treatment, or after pelletization, or they may be mixed in the molder. It is also possible to employ a method in which a master batch prepared beforehand by mixing a low-molecular-weight oxymethylene polymer (A) and a high-molecular-weight polyoxymethylene resin (B) is further mixed with the low-molecular-weight oxymethylene polymer (A) or the high-molecular-weight polyoxymethylene resin (B) to adjust the mixing ratio as desired.

In the polyoxymethylene resin composition of the present invention, it is imperative that the low-molecular-weight oxymethylene polymer (A) and the high-molecular-weight polyoxymethylene resin (B) are mixed homogeneously. Homogeneity of the mixture can be confirmed by the appearance of a single peak of melting point in the analysis of melting behavior of the polyoxymethylene resin composition by a differential calorimeter.

In the present invention, polymer (A) and resin (B) may be mixed after deactivating the polymerization catalyst, or the polymerization catalyst may be deactivated after mixing (A) and (B) in the form of crude polymers as described below.

In a method for continuously producing the polyoxymethylene resin composition according to the present invention, a crude polymer of low-molecular-weight oxymethylene polymer (A) and a crude polymer of high-molecular-weight polyoxymethylene resin (B) are produced simultaneously by the separate polymerizers in the equipment system consisting of at least two continuous bulk polymerizers connected in parallel and an extruder disposed successively thereto, then 100 parts by weight of the crude polymer of (B) and 1 to 500 parts by weight of the crude polymer of (A) are blended while deactivating the polymerization catalyst, and then a terminal stabilization treatment is conducted on said crude polymers by said extruder while continuously carrying out uniform melting and mixing. A resin composition with stabilized quality is provided by this method.

In another method for continuously producing the polyoxymethylene resin composition according to the present invention, a monomer or a mixture of a monomer and a co-monomer, and a molecular weight modifier are polymerized by a continuous bulk polymerizer using a cationic polymerization initiator as polymerization catalyst, and then the monomer or monomer/co-monomer mixture and the molecular weight modifier are further added to the obtained polymerization product in a state not causing deactivation of said cationic initiator so that the amount of the produced low-molecular-weight oxymethylene polymer will become 1 to 500 parts by weight per 100 parts by weight of the high-molecular-weight polyoxymethylene resin. In this operation, it is possible to change the ratio of the crude polymer of (A) to the crude polymer of (B) by varying the ratio of the amount of the initially polymerized monomer or monomer/co-monomer mixture and molecular weight modifier to the amount of the supplementarily added monomer or monomer/co-monomer mixture and molecular weight modifier. In this case, it is possible to supply the monomer or monomer/co-monomer mixture and molecular weight modifier successively by setting two or more continuous bulk polymerizers in series, or to supply the monomer or monomer/co-monomer mixture and molecular weight modifier from an opening at a half-way point of a self-cleaning type extruder/mixer such as double-screw extruder/mixer or double-screw paddle type continuous mixer.

In still another method for continuously producing the polyoxymethylene resin composition of the present invention, a crude polymer of low-molecular-weight oxymethylene polymer (A) and a crude polymer of high-molecular weight polyoxymethylene resin (B) are produced simultaneously by the separate polymerizers in an equipment system consisting of two or more slurry polymerizers connected in series or parallel, a terminal stabilizing means and an extruder disposed in succession, and 100 parts by weight of the crude polymer of (B) and 1 to 500 parts by weight of the crude polymer of (A) are blended while deactivating the polymerization catalyst, after which the unstable molecular terminal of the produced polymer is blocked, and uniform melting and mixing is carried out continuously by the extruder to obtain a resin composition with stabilized quality.

When a low-molecular-weight oxymethylene polymer (A) and a high-molecular-weight polyoxymethylene resin (B) are mixed in the form of crude polymers as described above, there is no need for conducting repeatedly the succeeding steps of deactivation and removal of the polymerization catalyst and terminal stabilization, and further the load applied to the equipment can be lessened as compared with the case where a low-molecular-weight oxymethylene polymer (A) and a high-molecular-weight polyoxymethylene resin (B) are treated singly.

Addition of a crystal nucleating agent in an amount of 1 to 10,000 ppm to the polyoxymethylene resin composition produced by mixing (A) and (B) according to the present invention greatly contributes to the improvement of mechanical properties and dimensional precision of the molded product. The type of the nucleating agent used in the present invention is not restricted; it is possible to use the conventional nucleating agents, for example, nitrides such as alumina, talc, mica, boron nitride, etc. and inorganic matters such as boric acid compounds. As for the amount of the crystal nucleating agent to be added, it is notable that if the amount added is less than 1 ppm, its improving effect is undetectably small, while if the amount exceeds 10,000 ppm, thermal stability of the produced polyoxymethylene resin composition is impaired. The more preferred amount of the crystal nucleating agent to be added is 10 to 5,000 ppm, even more preferably 50 to 1,000 ppm.

The polyoxymethylene resin composition of the present invention may contain, beside the said essential components, the ordinarily used known additives such as antioxidant, formaldehyde-reactive nitrogen-containing polymers or compounds, formic acid capturing agent, weather (light) stabilizer, releasing agent (lubricant), reinforcement, conducting agent, thermoplastic resin, thermoplastic elastomer, pigment, plasticizer, peroxide decomposer, basic assistant, antistatic agent, flame retardant, dye, filler, etc. In the composition of the present invention, it is also possible to contain other polymer(s) within limits not prejudicial to the properties of the composition. The ratios of these additives may be properly decided.

Hindered phenolic type is preferably used as the antioxidant. Examples of such antioxidants include n-octadecyl-3-(3'-5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-[3-(3,5-di-t-butyl-4-hydroxyphenyl)-propionate], 1,4-butanediol-bis-[3-(3,5-di-t-butyl-4-hydroxyphenyl)-propionate], triethyleneglycol-bis-[3-(3-t-butyl-5-methyl-4-hydroxyphenyl)-propionate], tetrakis-[methylene-3-(3',5'-di-t-butyl-4'-hydroxyphenyl)-propionate]methane, 3,9-bis[2-{3-(3-t-butyl-4-hydroxy-5-methylphenyl)propionyloxy}-1,1-dimethylethyl]-2,4,8,10-tetraoxapiro(5,5)undecane, N,N'-bis-3-(3',5'-di-t-butyl-4'-hydroxyphenyl)propionylhexamethylene-diamine, N,N'-tetramethylene-bis-3-(3'-methyl-5'-t-butyl-4'-hydroxyphenyl)propionyldiamine, N,N'-bis-[3-(3,5-di-t-butyl-4-hydroxyphenol)propionyl]hydrazine, N-salicyloyl-N'-salicylidenehydrazine, 3-(N-salicyloyl)amino-1,2,4-triazole, and N,N'-bis[2-{3-(3,5-di-t-butyl-4-hydroxyphenyl)propionyloxy}ethyl]-oxyamide. Of these compounds, triethyleneglycol-bis-[3-(3-t-butyl-5-methyl-4-hydroxyphenyl)-propionate] and tetrakis[methylene-3-(3',5'-di-t-butyl-4'-hydroxyphenyl)propionate]methane are preferred. These antioxidants may be used either alone or as a combination of two or more of them.

Examples of the formaldehyde-reactive nitrogen-containing polymers or compounds include polyamides such as nylon 4-6, nylon 6, nylon 6-6, nylon 6-10, nylon 6-12 and nylon 12, and their copolymers such as nylon 6/6-6/6-10 and nylon 6/6-12. They also include acrylic amides and their derivatives, and copolymers of acrylic amides and their derivatives and other vinyl monomers, for example, poly- β-alanine copolymers obtained by polymerizing acrylic amides and their derivatives and other vinyl monomers in the presence of a metallic alcoholate. These formaldehyde-reactive nitrogen-containing polymers may be used singly or as a combination of two or more.

Examples of the formaldehyde-reactive nitrogen atom-containing compounds having amino substituents include 2,4-diamino-sym-triazine, 2,4,6-triamino-sym-triazine, N-butylmelamine, N-phenylmelamine, N,N-diphenylmelamine, N,N-diallylmelamine, N,N',N'-triphenylmelamine, melem, mellon, melam, benzoguanamine(2,4-diamino-6-phenyl-sym-triazine), acetoguanamine(2,4-diamino-6-methyl-sym-triazine), 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, N,N,N',N-tetracyanoethylbenzoguanamine, saccinoguanamine, ethylenedimelamine, triguanamine, melamine cyanurate, ethylenedimelamine cyanurate, triguanamine cyanurate, ammeline, acetoguanamine and the like. These triazine derivatives may be used alone or by combining two or more of them.

Examples of the formic acid capturing agents include polycondensates of said triamino-substituted triazines or amino-substituted triazines and formaldehyde, such as melamine-formaldehyde polycondensates; hydroxides, inorganic acid salts, carboxylates or alkoxides of alkaline metals or alkaline earth metals, for example, hydroxides of sodium, potassium, magnesium, calcium or barium, carbonates, phosphates, silicates, borates and carboxylates of said metals.

The carboxylic acids of said carboxylates are preferably saturated or unsaturated aliphatic carboxylic acids having 10 to 36 carbon atoms, and these carboxylic acids may be substituted with a hydroxyl group. Examples of such aliphatic carboxylic acids include capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid, undecylenic acid, oleic acid, elaidic acid, cetoleic acid, erucic acid, brassidic acid, sorbic acid, linoleic acid, linolenic acid, arachidonic acid, propionic acid, stearolic acid, 12-hydroxydodecaonic acid, 3-hydroxydecanoic acid, 16-hydroxyhexadecanoic acid, 10-hydroxyhexadecanoic acid, 12-hydroxyoctadecanoic acid, 10-hydroxy-8-octadecanoic acid, and dl-erythro-9,10-dihydroxyoctadecanoic acid.

Examples of said carboxylates include calcium dimyristate, calcium dipalmitate, calcium distearate, calcium (myristate-palmitate), calcium (myristate-stearate) and calcium (palmitate-stearate). Of these carboxylates, calcium dipalmitate and calcium distearate are preferred.

In the present invention, two or more different formic acid capturing agents may be added simultaneously.

As the weather (light) stabilizer, it is preferable to use one or two or more compounds selected from benzotriazole-based or anilide oxalate-based ultraviolet absorbers and hindered amine-based light stabilizers.

Examples of the benzotriazole-based ultraviolet absorbers include 2-(2'-hydroxy-5'-methyl-phenyl)benzotriazole, 2-(2'-hydroxy-3,5'-di-t-butyl-phenyl)benzotriazole, 2-[2'-hydroxy-3',5'-bis(α, α-dimethylbenzyl)phenyl] benzotriazole, 2-(2'-hydroxy-3',5'-di-t-amylphenyl) benzotriazole, 2-(2'-hydroxy-3,5'-di-isoamyl-phenyl) benzotriazole, 2-[2'-hydroxy-3,5'-bis-(α, α-dimethylbenzyl) phenyl]-2H-benzotriazole, and 2-(2'-hydroxy-4'-octoxyphenyl)benzotriazole.

Examples of the anilide oxalate-based ultraviolet absorbers include 2-ethoxy-2'-ethyloxalic acid bisanilide, 2-ethoxy-5-t-butyl-2'-ethyloxalic acid bisanilide, and 2-ethoxy-3'-dodecyloxalic acid bisanilide. These ultraviolet absorbers may be used alone or as a mixture of two or more of them.

Examples of the hindered amine-based light stabilizers include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearoyloxy-2,2,6,6-tetramethylpiperidine, 4-cyclohexyloxy -2,2 ,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6, 6-tetramethylpiperidine, 4-(phenylcarbamoyloxy)-2,2,6,6-tetramethylpiperidine, bis4(2,2,6,b6-tetramethyl-4-piperidyl)-carbonate, bis(2,2,6,6-tetramethyl-4-piperidyl)-oxalate, Bis(2,2,6,6-tetramethyl-4-piperidyl)-malonate, bis (2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α, α'-bis(2,2,6,6-tetramethyl-4-piperidyloxy)-p-xylene, bis(2,2,6,6-tetramethyl-4-piperidyl) tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris (2,2,6,6-tetramethyl-4-piperidyl)-benzene-1,3,4-tricarboxylate, 1-[2-{3-(3,5-di-t-butyl-4-hydroxyphenyl) propionyloxy}butyl]-4-[3-(3,5-di-t-butyl-4-hydroxyphenyl) propionyloxy]-2,2,6,6-tetramethylpiperidine, and condensate of 1,2,3,4-butanetetracarboxylic acid, 1,2,2,6,6-pentamethyl-4-piperidinol and β, β, β', β'-tetramethyl-3,9-[2,4,8,10-tetraoxaspiro(5,5)undecane]diethanol. These hindered amine-based light stabilizers may be used alone or as a combination of two or more of them. The preferred weathering stabilizers are 2-[2'-hydroxy-3',5'-bis(α, α-dimethylbenzyl)phenyl]-benzotriazole, 2-(2'-hydroxy-3', 5'-di-t-butylphenyl)benzotriazole, 2-(2'-hydroxy-3',5'-di-t-amylphenyl)benzotriazole, bis(1,2,2,6,6-pentamethyl-4-piperidinyl)sebacate, bis(N-methyl-2,2,6,6-tetramethyl-4-piperidinyl)sebacate, bis(2,2,6,6-tetramethyl-4-piperidinyl) sebacate, and condensate of 1,2,3,4-butanetetracarboxylic acid, 1,2,2,6,6-pentamethyl-4-piperidinol and β, β, β', β'-tetramethyl-3,9-[2,4,8,10-tetraoxaspiro(5,5)undecane] diethanol.

As the releasing agent, alcohols, fatty acids and their esters, polyoxyalkylene glycol, olefin compounds having an average polymerization degree of 10 to 500 and silicone are preferably used.

As the reinforcing agent, inorganic fillers, glass fiber, glass bead, carbon fiber and the like can be used. As the conducting material, conductive carbon black, metal powder or fiber, and the like can be used.

As the thermoplastic resin, polyolefin resins, acrylic resins, styrene resins, polycarbonate resins, non-cured epoxy resins, and their modified products can be used.

Typical examples of the thermoplastic elastomers for use in the present invention are polyurethane-based elastomers, polyester-based elastomers, polystyrene-based elastomers and polyamide-based elastomers.

Pigment is used in the present invention in an amount of 0 to 5 parts by weight. When it is used in excess of 5 parts by weight, thermal stability of the composition deteriorates. Both inorganic and organic pigments can be used in the present invention. "Inorganic pigments" referred to herein are the pigments commonly used for coloring of resins, such as zinc sulfide, titanium oxide, barium sulfate, titan yellow and cobalt blue. "Organic pigments" are condensed azo, perinone, phthalocyanine, monoazo and other similar types of pigments.

The resin composition incorporated with the polyoxymethylene resin modifier according to the present invention is phenomenally improved in mechanical strength without using reinforcements and also has excellent fluidity and thermal stability in the molten state, so that it is capable of easily forming the molded articles with good appearance by a conventional molding method such as injecting molding, extrusion molding, blow molding or pressure molding. Also, the molded articles are capable of cutting and other works as desired.

Such molded articles can be used advantageously as parts of various kinds of machines, equipment, apparatus, etc., for example: structural parts such as gear, cam, slider, lever, arm, clutch, felt clutch, idler gear, pulley, roller, roll, key stem, key top, shutter, reel, shaft, joint, axle, bearing, guide, etc.; outsert molded resin parts, insert molded resin parts, chassis, tray, side plate, parts for OA equipment such as printer and copying machine, parts for cameras and video devices such as video tape recorder (VTR), video movie, digital video camera, etc., music, image and information devices such as cassette player, DAT, laser disc (LD), minidisc (MD), compact disc (CD) (including CD-ROM, CD-R and CD-RW), digital video disc (DVD) (including DVD-ROM, DVD-R, DVD-RW, DVD-RAM and DVD-audio), optical disc drive, MFD, MO, navigation system, mobile personal computer, etc., parts for communications apparatus such as cellular phone and facsimile, parts for electrical and electronic devices, parts for automobile, for example, fuel system parts such as gas tank, fuel pump module, valve, gas tank flange, etc., door-related parts such as door lock, door handle, window regulator, speaker grill, etc., seat belt-related parts such as slip ring, press button, etc., combination switch parts, parts for switches and clips, structural parts for fitting or removing the ball point or lead of propelling pencil, structural parts for opening and closing drainage outlets, parts of opening and closing section locking mechanism and commodity discharging mechanism of automatic vending machine; cord stopper, adjuster and button for clothing, water spray nozzle and spray hose joint, construction parts such as handrail at staircase, flooring support, etc., and parts for other types of commercial products such as throwaway camera, toy, fastener, chain, conveyor, buckle, sporting goods, slot machine, furniture, musical instruments, housing equipment, etc.

The present invention will be further illustrated by the following examples, but the invention is not limited by these examples. The technical terms and determination methods used in the following Examples and Comparative Examples are as described below.

<Number-average molecular weight and molecular weight distribution (Mw/Mn)>

Using a GPC device (HLC-8120 by Toso Corp.)(solvent: hexafluoroisopropanol), the number-average molecular weight (Mn) and the weight-average molecular weight (Mw) were detected by a low-angle laser beam scatter detector and determined by using the calibration curves obtained from the standard sample of the polyoxymethylene monomolecular polymer.

<Amount of copolymer component introduced>

Proton nuclear magnetic resonance spectrum was measured by the method described in JP-A-6-34583, and the amount of the copolymer component introduced was determined from the observed peak area of the Tim prescribed signal and indicated by molar ratio of ethylene oxide units to methylene oxide units.

<Terminal hydroxyl group concentration>

A precisely weighed amount of the sample was heated in a 220° C. thermostat under a vacuum of 2 mmHg for 50 minutes. After cooling, the sample was taken out of the thermostat, and the concentration (mol %) of the terminal hydroxyl group to the whole terminal groups of the low-molecular-weight oxymethylene polymer was determined from the amount of the decomposed sample and its number-average molecular weight.

<Melting point (° C.)>

Using a differential scanning calorimeter (DSC-2C by Perkin Elmer Corp.), the sample was once heated to 200° C. to melt it and then cooled to 100° C., after which it was again heated at a rate of 2.5° C./min and the peak top temperature of heat generation observed in the above process was indicated as melting point.

<Flexural modulus>

Using an injection molding machine IS-80A (Toshiba Co., Ltd.), the test piece was made under the conditions of: cylinder temperature=200° C.; injection pressure=6 MPa; injection time=15 seconds; cooling time=25 seconds; mold temperature=70° C., and its flexural modulus was determined according to ASTMD 790.

<Crystallinity>

Crystallinity of Production Examples:

Using a differential scanning calorimeter (DSC-7 by Perkin Elmer Corp.), 5 mg of the sample obtained from polymerization was maintained at 200° C. for one minute, then cooled to 70° C. at a rate of 200° C./min and then again heated to 200° C. at a rate of 5° C./min. The heat of fusion $\Delta H$ (J/g) was determined from the heat generation peak that appeared in the above process, and crystallinity was calculated from the following equation using the determined heat of fusion and the value ($\Delta Hf=222$ J/g) at 100% crystallinity shown in a literature (Journal of Research, 1961, Hoffman and Lauritzen):

$$\text{Crystallinity (\%)} = \Delta H / \Delta Hf \times 100$$

Crystallinity of Examples:

10 mg of resin cut out from the middle part f the test piece used for the determination of flexural modulus described above was heated to 200° C. at rate of 5° C./min using the same apparatus as used in determination of crystallinity of Production Examples, and crystallinity was determined from the heat of fusion generated in the above process.

<Rockwell hardness>

Using an injection molding machine IS-80A (Toshiba Co., Ltd.), a 48.0 mmΦ×3.0 mm circular test piece weighing 22.9×0.1 g was made and its Rockwell hardness was determined according to ASTMD 786 (M scale) using a Rockwell tester (FR-1 by Toyo Seiki KK).

<Chemical resistance>

The test piece was made by using the same injection molding machine under the same molding conditions as employed in making the test piece for the determination of flexural modulus described above. After molding, the test piece was dried in a vacuum dryer (below 2 mmHg, 100° C.) for 5 hours, and its weight (W1) at this point was measured. This test piece was then immersed in a container filled with acetone or chloroform and adjusted to 23° C., and kept in this state for 7 days. After this immersion treatment, the chemicals adhering to the test piece surface were wiped off and the weight (W2) of the test piece at this point was measured. From these results, the weight increment (%) was determined according to the following equation:

Weight increment (%)={(W2−W1)/W1}×100

The smaller the weight increment, the better the chemical resistance of the test piece.

<Thermal stability>

Thermal stability was shown by the critical residence time till generation of silver streaks on the test piece surface when the test piece was molded by a 3-ounce molding machine at cylinder temperature of 240° C.

<Retention of weld strength and elongation>

Using an injection molding machine IS-80A (Toshiba Co., Ltd.), the test pieces of the same configuration except for the position of the gate (either at both ends or at one end alone) were made under the conditions of: cylinder temperature= 200° C.; injection pressure=6 MPa; injection time 15 seconds; cooling time=25 seconds; mold temperature=70° C. Tensile strength and elongation were measured according to ASTMD 638, and the weld strength retention (%) and weld elongation retention (%) were determined from the following equations:

Weld strength retention (%)=(weld strength/non-weld strength)×100

Weld elongation retention (%)=(weld elongation/non-weld elongation)×100

The closer to 100% the calculated value is, the higher is the retention of weld strength or elongation.

<% and ppm>

All indications of % and ppm are by weight unless otherwise noted.

PRODUCTION EXAMPLE 1

To a double-screw paddle type continuous polymerizer (screw diameter: 3 inches, L/D=10) having a jacket capable of passing the heating medium and adjusted to 80° C., there were continuously supplied 12 kg/hr of trioxane, 414 g/hr of 1,3-dioxolane (0.042 mole to 1 mole of trioxane) as co-monomer and 313 g/hr of methylal with a purity of 98% and a methyl formate content of 1.1% as molecular weight modifier. Further, 39.6 g/hr of a cyclohexane solution of 1 wt % boron trifluoride di-n-butyl etherate was supplied as polymerization catalyst so that the ratio of boron trifluoride would become $1.5\times10^{-5}$ moles to 1 mole of trioxane to carry out polymerization. The oxymethylene copolymer drawn out from the continuous polymerizer was put into a 0.1% triethylamine solution to deactivate the polymerization catalyst. The deactivated oxymethylene copolymer was filtered by a centrifuge. The crude yield at this stage was 86%. To 100 parts by weight of the filtered oxymethylene copolymer, 1 part by weight of an aqueous solution containing hydroxylated choline formate (trimethyl-2-hydroxyethylammonium formate) as quaternary ammonium compound was added, uniformly mixed and dried at 120° C. The amount of hydroxylated choline formate added was 20 ppm calculated as nitrogen. The amount of hydroxylated choline formate was controlled by adjusting the concentration of hydroxylated choline formate in the aqueous solution containing it. 100 parts by weight of this oxymethylene copolymer after drying, 0.3 part by weight of 2,2'-methylenebis-(4-methyl-t-butylphenol) was added as antioxidant and the mixture was supplied to a vented double-screw extruder. 0.5 part by weight of water was added to 100 parts by weight of the molten oxymethylene copolymer in the extruder to decompose the unstable terminal portion of the polymer at an extruder setting temperature of 200° C. with 5-minute residence time in the extruder. The oxymethylene copolymer with its unstable terminal portion decomposed was devolatized under the condition of vent vacuum of 20 Torr and extruded into a cold water bath from the die portion of the extruder to obtain a flaky low-molecular-weight oxymethylene copolymer.

Number-average molecular weight and molecular weight distribution (Mw/Mn) of the obtained low-molecular-weight oxymethylene copolymer are shown in Table 1.

PRODUCTION EXAMPLES 2~13

In Production Examples 2 to 7, the procedure of Production Example 1 was carried out by changing the amount of the molecular weight modifier used for the polymerization as shown in Table 1. In Production Example 8, the procedure of Production Example 1 was followed except that the ratio of boron trifluoride in the polymerization catalyst was $2.0\times10^{-4}$ moles to 1 mole of trioxane. In Production Examples 9 to 13, the procedure of Production Example 1 was conducted by changing the amounts of 1,3-dioxolane and molecular weight modifier as shown in Table 1. Results are shown collectively in Table 1.

PRODUCTION EXAMPLES 14~16

The procedure of Production Example 1 was carried out by using 1,4-butanediol formal as co-monomer and changing the amount of the molecular weight modifier as shown in Table 1. Results are shown in Table 1.

PRODUCTION EXAMPLE 17

To a 5-litre-capacity kneader provided with two agitating blades and a jacket capable of passing the heating medium, 2 kg of trioxane, 69 kg of 1,3-dioxolane (0.042 mole to 1 mole of trioxane) as co-monomer and 52.2 g of methylal as molecular weight modifier were supplied and mixed. Further, 6.6 g of a cyclohexane solution of 1 wt % boron trifluoride di-n-butyl etherate was added as polymerization catalyst so that the ratio of boron trifluoride would become $1.5\times10^{-5}$ moles to 1 mole of trioxane to carry out polymerization. After 30 minutes of polymerization reaction, 2 litres of a 0.1% aqueous solution of tributylamine was added to deactivate the catalyst to stop the reaction. The contents of the kneader were filtered out, washed and dried to give a crude yield of 87%. To 100 parts by weight of the thus obtained oxymethylene copolymer, 1 part by weight of an aqueous solution containing hydroxylated choline formate (trimethyl-2-hydroxyethylammonium formate) as quaternary ammonium compound was added, uniformly mixed and dried at 120° C. The amount of hydroxylated choline formate was 20 ppm calculated as nitrogen. Adjustment of the amount of hydroxylated choline formate was made by controlling the concentration of hydroxylated choline formate in the aqueous solution containing it. To 100 parts by weight of this oxymethylene copolymer after drying, 0.3 part by weight of 2,2'-methylenebis-(4-methyl-t-butylphenol) was added as antioxidant and the mixture was supplied to a vented double-screw extruder. 0.5 part by weight of water was added to 100 parts by weight of the molten oxymethylene copolymer in the extruder to decompose the unstable terminal portion of the polymer at an extruder setting temperature of 200° C. with 5-minute residence time in the extruder. The oxymethylene copolymer with its unstable terminal portion decomposed was devolatized under the condition of vent vacuum of 20 Torr and extruded into a cold water bath from the die section of the extruder to obtain a flaky low-molecular-weight oxymethylene copolymer.

Number-average molecular weight and molecular weight distribution (Mw/Mn) of the obtained low-molecular-weight oxymethylene copolymer are shown in Table 1.

PRODUCTION EXAMPLE 18

The procedure of Production Example 17 was carried out by changing the amount of molecular weight modifier and polymerization catalyst used for the polymerization as shown in Table 1. Results are shown in Table 1. There is a tendency that use of a smaller amount of molecular weight modifier provides a greater improvement of molecular weight distribution (Mw/Mn) as compared with Production Example 17. This is probably due to higher homogeneity of the polymerization system than that of Production Example 17.

PRODUCTION EXAMPLE 19

Polymerization was carried out at 58° C. by continuously feeding 600 g/hr of dehydrated formaldehyde gas, 0.0011 mol/hr of dimethyldistearyl-ammonium acetate as catalyst and 40.8 g/hr of acetic anhydride as molecular weight modifier into a 5-litre tank provided with a jacket capable of passing the heating medium. The resulting crude polymer was reacted in a 1:1 mixture of hexane and acetic anhydride at 140° C. for 2 hours to acetylate the molecular terminal. After the reaction, the polymer was filtered out and dried for 3 hours in a vacuum dryer adjusted to lower than 2 mmHg and set at 80° C. The ratio (concentration) of the terminal hydroxyl group to the whole terminal groups in the produced low-molecular-weight oxymethylene polymer was 0.5 mol %. Further, number-average molecular weight and molecular weight distribution (Mw/Mn) of the polymer were evaluated and shown in Table 1.

PRODUCTION EXAMPLES 20~24

The same procedure of Production Example 19 was carried out by changing the amount of the molecular weight modifier used for the polymerization as shown in Table 1. Results are shown in Table 1.

EXAMPLES 1~3

The low-molecular-weight polyoxymethylene obtained according to Production Example 1 was added, at the rates of 10 parts by weight, 30 parts by weight and 50 parts by weight, respectively, to 100 parts by weight of a commercial oxymethylene copolymer resin having a number-average molecular weight of 70,000 (TENAC 3510 produced by Asahi Chemical Industries Co., Ltd.), and the mixture was melted and kneaded by a vented double-screw extruder (210° C., L/D=25) at a screw speed of 100 rpm and a discharge rate of 5 kg/hr, and pelletized. The pellets were dried at 80° C. for 3 hours and injection molded into dumbells conforming to ASTM-D-638 at a resin temperature of 200° C. and a mold temperature of 70° C., and their flexural modulus, Rockwell hardness, chemical resistance and weldability were determined. Thermal stability was also determined. Results are shown in Table 2.

EXAMPLES 4 and 5

The same procedure as in Example 1 was carried out except that the low-molecular-weight polyoxymethylene obtained according to Production Example 1 was added at the rates of 100 parts by weight and 400 parts by weight, respectively, to 100 parts by weight of the oxymethylene copolymer resin having a number-average molecular weight of 200,000 obtained according to Production Example 7. Results are shown in Table 2.

EXAMPLE 6

The same procedure as in Example 1 was carried out except that the low-molecular-weight polyoxymethylene obtained according to Production Example 1 was added at a rate of 30 parts by weight to 100 parts by weight of a commercial oxymethylene homopolymer resin having a number-average molecular weight of 40,000 (TENAC 5010 produced by Asahi Chemical Industries Co., Ltd.). Results are shown in Table 2.

EXAMPLES 7 and 8

The same procedure as in Example 1 was conducted except that the low-molecular-weight polyoxymethylenes obtained according to Production Examples 3 and 4 were added each at a rate of 30 parts by weight to 100 parts by weight of a commercial oxymethylene copolymer resin having a number-average molecular weight of 50,000 (TENAC 3510 produced by Asahi Chemical Industries Co., Ltd.). Results are shown in Table 2.

EXAMPLE 9

The same procedure as in Example 1 was carried out except that 30 parts by weight of the low-molecular-weight polyoxymethylene obtained according to Production Example 1 and 500 ppm of boron nitride as crystal nucleating agent were added to 100 parts by weight of a commercial oxymethylene copolymer resin having a number-average molecular weight of 70,000 (TENAC 3510 produced by Asahi Chemical Industries Co., Ltd.). Results are shown in Table 2.

EXAMPLE 10

The same procedure as in Example 1 was conducted except that the low-molecular-weight polyoxymethylene obtained according to Production Example 15 was added at a rate of 10 parts by weight to 100 parts by weight of a commercial oxymethylene copolymer resin having a number-average molecular weight of 70,000 (TENAC 3510 produced by Asahi Chemical Industries Co., Ltd.). Results are shown in Table 2.

EXAMPLE 11

The same procedure as in Example 1 was carried out except that the low-molecular-weight polyoxymethylene obtained according to Production Example 9 was added at a rate of 30 parts by weight to 100 parts by weight of a commercial oxymethylene copolymer resin having a number-average molecular weight of 70,000 (TENAC 3510 produced by Asahi Chemical Industries Co., Ltd.). Results are shown in Table 2.

EXAMPLES 12~14

The same procedure as in Example 1 was carried out except that the low-molecular-weight polyoxymethylenes obtained according to Production Examples 9, 11 and 1 were added each at a rate of 30 parts by weight to 100 parts by weight of an oxymethylene copolymer resin having a melting point of 169.5° C. and a number-average molecular weight of 82,000. Results are shown in Table 2.

COMPARATIVE EXAMPLES 1~3

The same procedure as in Example 1 was carried out except that the low-molecular-weight polyoxymethylenes obtained according to Production Examples 2, 5 and 17 were added each at a rate of 30 parts by weight to 100 parts by weight of a commercial oxymethylene copolymer resin having a number-average molecular weight of 50,000 (TENAC 4520 produced by Asahi Chemical Industries Co., Ltd.). Results are shown in Table 2.

COMPARATIVE EXAMPLES 4~7

The pellets of the commercial oxymethylene polymer resins (TENAC 3510, 4520 and 5010 produced by Asahi Chemical Industries Co., Ltd.) and the oxymethylene copolymer resin having a number-average molecular weight of 200,000 obtained according to Production Example 7 were dried at 80° C. for 3 hours and injection molded into dumbbells conforming to ASTM-D-638 at a resin temperature of 200° C. and a mold temperature of 70° C., and their flexural modulus, Rockwell hardness, chemical resistance, weldability and thermal stability were determined. Results are shown in Table 2.

COMPARATIVE EXAMPLE 8

The same procedure as in Example 1 was conducted except that 500 ppm of boron nitride alone was added as a crystal nucleating agent to a commercial oxymethylene copolymer resin (TENAC 3510 produced by Asahi Chemical Industries Co., Ltd.). Results are shown in Table 2.

COMPARATIVE EXAMPLE 9

The same procedure as in Example 1 was conducted except that the low-molecular-weight polyoxymethylene obtained according to Production Example 12 was added at a rate of 30 parts by weight to 100 parts by weight of a commercial oxymethylene copolymer resin having a number-average molecular weight of 70,000 (TENAC 3510 produced by Asahi Chemical Industries Co., Ltd.). Results are shown in Table 2.

COMPARATIVE EXAMPLE 10

The same procedure as in Example 1 was carried out except that the low-molecular-weight polyoxymethylene obtained according to Production Example 14 was added at a rate of 10 parts by weight to 100 parts by weight of a commercial oxymethylene copolymer resin having a number-average molecular weight of 70,000 (TENAC 3510 produced by Asahi Chemical Industries Co., Ltd.). Results are shown in Table 2.

COMPARATIVE EXAMPLE 11

The same procedure as in Example 1 was carried out except that a commercial talc (MS Talc produced by Nippon Talc Co., Ltd.) was added at a rate of 25 parts by weight to 100 parts by weight of a commercial oxymethylene copolymer resin having a number-average molecular weight of 50,000 (TENAC 4520 produced by Asahi Chemical Industries Co., Ltd.). Results are shown in Table 2.

COMPARATIVE EXAMPLE 12

The pellets of the oxymethylene copolymer resin obtained according to Production Example 10 were dried at 80° C. for 3 hours and injection molded into a dumbbell conforming to ASTM-D-638 at a resin temperature of 200° C. and a mold temperature of 70° C., and its flexural modulus, Rockwell hardness, chemical resistance, weldability and thermal stability were determined. Results are shown in Table 2.

EXAMPLE 15

The same procedure as in Example 1 was carried out except that the low-molecular-weight polyoxymethylene obtained according to Production Example 21 was added at a rate of 44 parts by weight to 100 parts by weight of a commercial oxymethylene homopolymer resin having a number-average molecular weight of 55,000 (TENAC 2010 produced by Asahi Chemical Industries Co., Ltd.). Results are shown in Table 2.

EXAMPLES 16~18

The same procedure as in Example 1 was carried out except that the low-molecular weight polyoxymethylenes obtained according to Production Examples 19, 21 and 22 were added each at a rate of 44 parts by weight to 100 parts by weight of a commercial oxymethylene homopolymer resin having a number-average molecular weight of 55,000 (TENAC 2010 produced by Asahi Chemical Industries Co., Ltd.), and that 1 part by weight of an acrylic amide was further added as formaldehyde-reactive nitrogen compound. Results are shown in Table 2.

EXAMPLES 19~21

The same procedure as in Example 1 was carried out except that the low-molecular-weight polyoxymethylene obtained according to Production Example 21 was added at a rate of 44 parts by weight to 100 parts by weight of the polyoxymethylene having a number-average molecular weight of 100,000 obtained according to Production Example 24, a commercial oxymethylene copolymer resin having a number-average molecular weight of 70,000 (TENAC 3510 produced by Asahi Chemical Industries Co., Ltd.) and a commercial oxymethylene block copolymer resin having a number-average molecular weight of 34,000 (TENAC LA541 produced by Asahi Chemical Industries Co., Ltd.), respectively. Results are shown in Table 2.

EXAMPLE 22

The same procedure as in Example 1 was carried out except that the low-molecular-weight polyoxymethylene obtained according to Production Example 13 was added at a rate of 30 parts by weight to 100 parts by weight of the oxymethylene copolymer resin having a number-average molecular weight of 82,000 and a melting point of 169.5° C. obtained according to Production Example 10. Results are shown in Table 2.

COMPARATIVE EXAMPLES 13 and 14

The same procedure as in Example 1 was carried out except that the low-molecular-weight polyoxymethylenes obtained according to Production Examples 20 and 23 were added each at a rate of 44 parts by weight to 100 parts by weight of a commercial oxymethylene homopolymer resin having a number-average molecular weight of 55,000 (TENAC 2010 produced by Asahi Chemical Industries Co., Ltd.), and that 1 part by weight of an acrylic amide was further added as formaldehyde-reactive nitrogen compound. Results are shown in Table 2.

EXAMPLE 23

Two double-screw paddle type continuous polymerizers (screw diameter: 3 inches, L/D=10) provided with a jacket capable of passing the heating medium were adjusted to 80° C. To one of these polymerizers were continuously supplied 12 kg/hr of trioxane, 143 g/hr of 1,3-dioxolane (0.014 mole per 1 mole of trioxane) as co-monomer and 14 g/hr of methylal as molecular weight modifier, and then a cyclohexane solution of 1 wt % boron trifluoride di-n-butyl etherate was further supplied continuously as polymerization catalyst at a rate of 39.6 g/hr so that the amount of boron trifluoride would become $1.5 \times 10^{-5}$ moles per 1 mole of trioxane. The oxymethylene copolymer discharged out of the polymerizer was put into a 0.1% triethylamine solution to deactivate the polymerization catalyst, and the deactivated oxymethylene copolymer was filtered by a centrifuge. The crude yield at this stage was 85%. This crude polymer was subjected to a terminal stabilization treatment by the same method as used in Production Example 1, and its number-average molecular weight and molecular weight distribution (Mw/Mn) were determined.

Meanwhile, to another polymerizer, there were continuously supplied 5.2 kg/hr of trioxane, 62 g/hr of 1,3-dioxolane (0.014 mole per 1 mole of trioxane) as co-monomer and 136 g/hr of methylal as molecular weight modifier, and then a cyclohexane solution of 1 wt % of boron trifluoride di-n-butyl etherate was further supplied continuously as polymerization catalyst at a rate of 17.2 g/hr so that the amount of boron trifluoride would become $1.5 \times 10^{-5}$ moles per 1 mole of trioxane. The oxymethylene copolymer discharged out of the polymerizer was put into a 0.1% triethylamine solution to deactivate the polymerization catalyst. The deactivated oxymethylene copolymer was filtered by a centrifuge to give a crude yield of 84%. This crude polymer was subjected to a terminal stabilization treatment in the same way as in Production Example 1, and its number-average molecular weight and molecular weight distribution (Mw/Mn) were determined.

After evaluating the crude yield in the respective polymerizers, the oxymethylene copolymers discharged out from these two continuous polymerizers were mixed by stirring together with a 0.1% triethylamine solution in a bath provided with a stirrer to deactivate the polymerization catalyst. The deactivated oxymethylene copolymer mixture was filtered by a centrifuge. To 100 parts by weight of the filtered-out oxymethylene copolymer mixture, 1 part by weight of an aqueous solution containing hydroxylated choline formate (trimethyl-2-hydroxyethylammonium formate) as quaternary ammonium compound was added, uniformly mixed and dried at 120° C. The amount of hydroxylated choline formate added was .20 ppm calculated as nitrogen. Adjustment of the amount of hydroxylated choline formate was made by controlling the concentration of hydroxylated choline formate in the aqueous solution containing it. To 100 parts by weight of the oxymethylene copolymer mixture after drying, 0.3 part by weight of 2,2'-methylenebis-(4-methyl-t-butylphenol) was added as antioxidant, and the mixture was supplied to a vented double-screw extruder. Water was added in an amount of 0.5 part by weight to 100 parts by weight of the molten oxymethylene copolymer mixture in the extruder to decompose the unstable terminal portion at an extruder setting temperature of 200° C. with 5-minute residence time in the extruder. The oxymethylene copolymer mixture having the unstable terminal portion decomposed was devolatized under vent vacuum of 20 Torr, then extruded into a cold water bath from the die section of the extruder and pelletized. To 100 parts by weight of these pellets, 0.1 part by weight of calcium distearate, 0.05 part by weight of calcium dipalmitate, 0.05 part by weight of nylon 66, 0.025 part by weight of ethylene glycol distearate and 0.005 part by weight of ethylene glycol dipalmitate were added and mixed, and the mixture was melted and kneaded by a vented single-screw extruder to obtain the final pellets. These pellets were dried at 80° C. for 3 hours and injection molded into a dumbbell conforming to ASTM-D-638 at a resin temperature of 200° C. and a mold temperature of 70° C., and its flexural modulus, Rockwell hardness, chemical resistance, weldability and thermal stability were evaluated. Results are shown in Table 3.

EXAMPLE 24

To a double-screw paddle type continuous polymerizer (screw diameter: 3 inches, L/D=10) provided with a jacket capable of passing the heating medium and set at 80° C., 12 kg/hr of trioxane, 143 g/hr of 1,3-dioxolane (0.014 mole per 1 mole of trioxane) as co-monomer and 14 g/hr of methylal as molecular weight modifier were continuously supplied. Then 39.6 g/hr of a cyclohexane solution of 1 wt % boron trifluoride di-n-butyl etherate was further supplied as polymerization catalyst so that the amount of boron trifluoride would become 1.5×10-5 moles per 1 mole of trioxane. After the polymerization reaction started, 5.2 kg/hr of trioxane, 62 g/hr of 1,3-dioxolane (0.014 mole per 1 mole of trioxane) as co-monomer and 136 g/hr of methylal as molecular weight modifier were additionally supplied to the polymerizer from a material supplementing opening provided at a middle part (at a distance of L/D=5 from the material feed opening) of the polymerizer to carry out polymerization.

The oxymethylene copolymer discharged out of the continuous polymerizer was put into a 0.1% triethylamine solution to deactivate the polymerization catalyst, and the deactivated oxymethylene copolymer was filtered by a centrifuge to give a crude yield of 88%. To 100 parts by weight of the filtered oxymethylene copolymer, 1 part by weight of an aqueous solution containing hydroxylated choline formate (trimethyl-2-hydroxyethylammonium formate) as quaternary ammonium compound was added, uniformly mixed and dried at 120° C. The amount of hydroxylated choline formate added was 20 ppm calculated as nitrogen. Adjustment of the amount of hydroxylated choline formate was made by controlling the concentration of hydroxylated choline formate in the aqueous solution containing it. To 100 parts by weight of this oxymethylene copolymer after drying, 0.3 part by weight of 2,2'-methylenebis-(4-methyl-t-butylphenol) was added as antioxidant, and the mixture was supplied to a vented double-screw extruder. Water was added in an amount of 0.5 part by weight to 100 parts by weight of the molten oxymethylene copolymer in the extruder to decompose the unstable terminal portion at an extruder setting temperature of 200° C. with 5-minute residence time in the extruder. The oxymethylene copolymer having its unstable terminal portion decomposed was devolatized under vent vacuum of 20 Torr, then extruded into a cold water bath from the die section of the extruder and pelletized. To 100 parts by weight of these pellets, 0.1 part by weight of calcium distearate, 0.05 part by weight of calcium dipalmitate, 0.05 part by weight of nylon 66, 0.025 part by weight of ethylene glycol distearate and 0.005 parts by weight of ethylene glycol dipalmitate were added and mixed, and the mixture was melted and kneaded by a vented single-screw extruder to obtain the final pellets. These pellets were dried at 80° C. for 3 hours and then injection molded into a dumbbell conforming to ASTM-D-638 at a resin temperature of 200° C. and a mold temperature of 70° C., and its flexural modulus, Rockwell hardness, chemical resistance, weldability and thermal stability were evaluated.

The number-average molecular weight and molecular weight distribution (Mw/Mn) of the pellets were also evaluated. Results are shown in Table 3.

EXAMPLE 25

To one of the two double-screw paddle type continuous polymerizers (screw diameter: 3 inches, L/D=10) provided with a jacket capable of passing the heating medium and set at 80° C., there were continuously supplied 12 kg/hr of trioxane, 143 g/hr of 1,3-dioxolane (0.014 mole per 1 mole of trioxane) as co-monomer, 13.5 g/hr of methylal as molecular weight modifier, and 12 g/hr of hydrogenated polybutadiene having both ends of its molecule hydroxylated which is liquid at 23° C. under 1 atm and represented by the following formula:

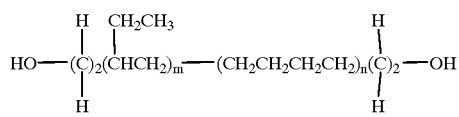

wherein m=80 mol %, n=20 mol %, and n exists randomly to m; number-average molecular weight: 2,390; iodine value: 18 g-$I_2$/100 g; Mw/Mn=1.5.

Further, a cyclohexane solution of 1 wt % boron trifluoride di-n-butyl etherate was continuously supplied as polymerization catalyst at a rate of 39.6 g/hr so that the amount of boron trifluoride would become $1.5 \times 10^{-5}$ moles per 1 mole of trioxane to carry out polymerization. The oxymethylene copolymer discharged out of the polymerizer was put into a 0.1% triethylamine solution to deactivate the polymerization catalyst, and the deactivated oxymethylene copolymer was filtered by a centrifuge to give a crude yield of 86%. This crude polymer was further subjected to a terminal stabilization treatment in the same way as in Production Example 1, and its number-average molecular weight and molecular weight distribution (Mw/Mn) were evaluated.

Meanwhile, to another polymerizer were continuously supplied 5.2 kg/hr of trioxane, 62 g/hr of 1,3-dioxolane (0.014 mole per 1 mole of trioxane) as co-monomer and 136 g/hr of methylal as molecular weight modifier. Further, as polymerization catalyst, 17.2 g/hr of a cyclohexane solution of 1 wt % boron trifluoride di-n-butyl etherate was continuously supplied so that the amount of boron trifluoride would become $1.5 \times 10^{-5}$ moles per 1 mole of trioxane to carry out polymerization. The oxymethylene copolymer discharged out of the polymerizer was put into a 0.1% triethylamine solution to deactivate the polymerization catalyst, and the deactivated oxymethylene copolymer was filtered by a centrifuge. The crude yield at this stage was 84%. This crude polymer was further subjected to a terminal stabilization treatment by the method used in Production Example 1, and its number-average molecular weight and molecular weight distribution (Mw/Mn) were evaluated.

After evaluating the crude yields in the respective polymerizers, the oxymethylene copolymers discharged from these two continuous polymerizers were mixed by stirring together with a 0.1% triethylamine solution in a bath provided with a stirrer to deactivate the polymerization catalyst, and the deactivated oxymethylene copolymer mixture was filtered by a centrifuge. To 100 parts by weight of the filtered oxymethylene copolymer mixture, 1 part by weight of an aqueous solution containing hydroxylated choline formate (trimethyl-2-hydroxyethylammonium formate) as quaternary ammonium compound was added, uniformly mixed and dried at 120° C. The amount of hydroxylated choline formate added was 20 ppm calculated as nitrogen. Adjustment of the amount of hydroxylated choline formate was made by controlling the concentration of hydroxylated choline formate in an aqueous solution containing it. To 100 parts by weight of the oxymethylene copolymer mixture after drying, 0.3 part by weight of 2,2'-methylenebis-(4-methyl-t-butylphenol) was added as antioxidant, and the mixture was supplied to a vented double-screw extruder. Water was added in an amount of 0.5 part by weight to 100 parts by weight of the molten oxymethylene copolymer mixture in the extruder to decompose the unstable terminal portion at an extruder setting temperature of 200° C. with 5-minute residence time in the extruder. The oxymethylene copolymer mixture having the unstable terminal portion decomposed was devolatized under vent vacuum of 20 Torr, extruded into a cold water bath from the die section of the extruder and pelletized. To 100 parts by weight of these pellets, 0.1 part by weight of calcium distearate, 0.05 part by weight of calcium dipalmitate, 0.05 part by weight of nylon 66, 0.025 part by weight of ethylene glycol distearate and 0.005 part by weight of ethylene glycol dipalmitate were added and mixed, and the mixture was melted and kneaded by a vented single-screw extruder to obtain the final pellets. These pellets were dried at 80° C. for 3 hours and then injection molded into a dumbbell conforming to ASTM-D-638 at a resin temperature of 200° C. and a mold temperature of 70° C., and its flexural modulus, Rockwell hardness, chemical resistance, weldability and thermal stability were evaluated. Results are shown in Table 3.

EXAMPLE 26

To one of the two 5-litre tank polymerizers having a jacket capable of passing the heating medium, 600 g/hr of dehydrated formaldehyde gas, 0.0011 mol/hr of dimethyldistearylammonium acetate as catalyst and 0.6 g/hr of acetic anhydride as molecular weight modifier were continuously supplied to carry out polymerization at 58° C. to give a crude yield of 80%. This crude polymer was further subjected to a terminal stabilization treatment by the same method as used in Production Example 18, and its number-average molecular weight and molecular weight distribution (Mw/Mn) were evaluated.

Meanwhile, to another polymerizer, 260 g/hr of dehydrated formaldehyde gas, 0.0005 mol/hr of distearylallylammonium acetate as catalyst and 17.5 g/hr of acetic anhydride as molecular weight modifier were continuously supplied to carry out polymerization at 58° C., providing a crude yield of 82%. This crude polymer was further subjected to a terminal stabilization treatment according to the method of Production Example 17, and its number-average molecular weight and molecular weight distribution (Mw/Mn) were evaluated.

After evaluating the crude yield in the respective polymerizers, the oxymethylene polymers drawn off from these two polymerizers were mixed by stirring together with a 1:1 mixture of hexane and acetic anhydride in a bath provided with a stirrer and reacted at 140° C. for 2 hours to acetylate the end of the molecule. After reaction, the polymer was filtered out, dried by a vacuum dryer (below 2 mmHg, 80° C.) for 3 hours, and then melted and kneaded by a vented double-screw extruder (210° C., L/D=25) at a screw speed of 100 rmp and a discharge rate of 5 kg/hr to obtain the pellets. These pellets were dried at 80° C. for 3 hours and injection molded into a dumbbell conforming to ASTM-D-638 at a resin temperature of 200° C. and a mold temperature of 70° C., and its flexural modulus, Rockwell hardness, chemical resistance, weldability and thermal stability were determined. Results are shown in Table 2.

EXAMPLE 27

Two 5-litre tank polymerizers provided with a jacket capable of passing the heating medium were connected in series. To the front polymerizer, 600 g/hr of dehydrated formaldehyde gas, 0.0011 mol/hr of dimethyldistearylammonium acetate as catalyst and 0.6 g/hr of acetic anhydride as molecular weight modifier were continuously supplied to carry out polymerization at 58° C. The produced crude polymer was continuously transferred to the rear polymerizer while continuously supplementing thereto 260 g/hr of dehydrated formaldehyde gas, 0.0005 mol/hr of dimethyldistearyl-ammonium acetate as catalyst and 17.5 g/hr of acetic anhydride as molecular weight modifier to conduct polymerization at 58° C. The oxymethylene polymer discharged out from the rear polymerizer was mixed by stirring with a 1:1 mixture of hexane and acetic anhydride in a bath having a stirrer and reacted at 140° C. for 2 hours to acetylate the end of the molecule. The produced polymer was filtered out and dried by a vacuum dryer (below 2 mmHg, 80° C.) for 3 hours. The total yield was 81%. The resulting product was melted and kneaded by a vented double-screw extruder (210° C., L/D=25) at a screw speed of 100 rpm and a discharge rate of 5 kg/hr to obtain the pellets. These pellets were dried at 80° C. for 3 hours and injection molded into a dumbbell conforming to ASTM-D-638 at a resin temperature of 200° C. and a mold temperature of 70° C., and its flexural modulus, Rockwell hardness, chemical resistance, weldability and thermal stability were determined. Results are shown in Table 2.

INDUSTRIAL APPLICABILITY

According to the present invention, there is provided an oxymethylene polymer resin composition which is greatly improved in mechanical properties without using any reinforcement, also excels in fluidity and thermal stability in the molten state, and hence is long in critical residence time till generation of silver streaks and capable of easily forming the molded articles with good visual appearance. Further, the present resin composition has a surprising effect of improving Rockwell hardness and chemical resistance of the molded articles without impairing their weldability and anti-warping properties.

TABLE 1

|  | AMOUNT OF MOLECULAR WEIGHT MODIFIER USED | AMOUNT OF COPOLYMER COMPONENT INTRODUCED (*) | MELTING POINT (° C.) | NUMBER-AVERAGE MOLECULAR WEIGHT (Mn) | MOLECULAR WEIGHT DISTRIBUTION (Mw/Mn) | CRYSTALLINITY (%) |
|---|---|---|---|---|---|---|
| PRODUCTION EXAMPLE 1 | 313 g/hr | 1.45 | 159.0 | 3500 | 1.6 | 85 |
| PRODUCTION EXAMPLE 2 | 1000 g/hr | 1.45 | 132.3 | 900 | 2.2 | 87 |
| PRODUCTION EXAMPLE 3 | 200 g/hr | 1.45 | 161.2 | 5200 | 1.8 | 84 |
| PRODUCTION EXAMPLE 4 | 157 g/hr | 1.45 | 162.5 | 7400 | 2.0 | 83 |
| PRODUCTION EXAMPLE 5 | 78 g/hr | 1.45 | 163.5 | 14000 | 2.3 | 70 |
| PRODUCTION EXAMPLE 6 | 32 g/hr | 1.45 | 163.5 | 35000 | 2.2 | 60 |
| PRODUCTION EXAMPLE 7 | 5 g/hr | 1.45 | 163.5 | 200000 | 2.4 | 50 |
| PRODUCTION EXAMPLE 8 | 313 g/hr | 1.45 | 158.8 | 3500 | 3.3 | 86 |
| PRODUCTION EXAMPLE 9 | 313 g/hr | 0.5 | 165.0 | 3500 | 1.7 | 94 |
| PRODUCTION EXAMPLE 10 | 14 g/hr | 0.5 | 169.5 | 82000 | 1.6 | 65 |
| PRODUCTION EXAMPLE 11 | 200 g/hr | 0.8 | 167.0 | 5200 | 1.6 | 91 |
| PRODUCTION EXAMPLE 12 | 313 g/hr | 35.0 | 75.2 | 3700 | 1.8 | 50 |
| PRODUCTION EXAMPLE 13 | 313 g/hr | 0 | 168.5 | 3700 | 1.9 | 95 |
| PRODUCTION EXAMPLE 14 | 1000 g/hr | 1.46 | 125.0 | 1100 | 2.3 | 75 |
| PRODUCTION EXAMPLE 15 | 200 g/hr | 1.46 | 153.0 | 5500 | 2.3 | 80 |
| PRODUCTION EXAMPLE 16 | 32 g/hr | 1.46 | 158.0 | 35000 | 2.3 | 55 |
| PRODUCTION EXAMPLE 17 | 52.2 g | 1.45 | 159.2 | 3500 | 3.5 | 85 |
| PRODUCTION EXAMPLE 18 | 5.2 g | 1.44 | 164.0 | 35000 | 2.6 | 60 |
| PRODUCTION EXAMPLE 19 | 40.8 g/hr | 0 | 152.0 | 1500 | 2.5 | 95 |
| PRODUCTION EXAMPLE 20 | 84.9 g/hr | 0 | 150.0 | 900 | 2.5 | 95 |
| PRODUCTION EXAMPLE 21 | 20.4 g/hr | 0 | 155.0 | 3000 | 2.5 | 95 |
| PRODUCTION EXAMPLE 22 | 7.4 g/hr | 0 | 169.1 | 8000 | 2.5 | 90 |
| PRODUCTION EXAMPLE 23 | 4.1 g/hr | 0 | 172.4 | 15000 | 2.5 | 83 |
| PRODUCTION EXAMPLE 24 | 0.6 g/hr | 0 | 174.0 | 100000 | 2.5 | 65 |

(*)The amount of copolymer component introduced is shown by mol % of ethylene oxide units (or butylene oxide units) to methylene oxide units.

TABLE 2

| | HIGH-MOLECULAR-WEIGHT POLYOXYMETHYLENE RESIN (B) | LOW-MOLECULAR-WEIGHT OXYMETHYLENE POLYMER (A) | | FLEXURAL MODULUS (GPa) | CRYSTAL-LINITY (%) | ROCKWELL HARDNESS (M SCALE) | CHEMICAL RESISTANCE (WEIGHT INCREMENT) (%) | | WELDABILITY | | THERMAL STABILITY (MIN) |
|---|---|---|---|---|---|---|---|---|---|---|---|
| | | TYPE | AMOUNT PER 100 PARTS BY WEIGHT OF (B) (PARTS BY WEIGHT) | | | | ACETONE | CHLOROFORM | ELONGATION RETENTION (%) | STRENGTH RETENTION (%) | |
| EXAMPLE 1 | 3510 | POLYMER OF PRODUCTION EXAMPLE 1 | 10 | 3.7 | 70 | 93 | 0.20 | 1.00 | 98.3 | 65.3 | 145 |
| EXAMPLE 2 | 3510 | POLYMER OF PRODUCTION EXAMPLE 1 | 30 | 4.0 | 75 | 97 | 0.15 | 0.71 | 98.5 | 67.5 | 145 |
| EXAMPLE 3 | 3510 | POLYMER OF PRODUCTION EXAMPLE 1 | 50 | 4.2 | 78 | 101 | 0.07 | 0.42 | 98.3 | 65.4 | 140 |
| EXAMPLE 4 | POLYMER OF PRODUCTION EXAMPLE 7 | POLYMER OF PRODUCTION EXAMPLE 1 | 100 | 3.6 | 70 | 110 | 0.03 | 0.21 | 98.8 | 63.1 | 140 |
| EXAMPLE 5 | POLYMER OF PRODUCTION EXAMPLE 7 | POLYMER OF PRODUCTION EXAMPLE 1 | 400 | 4.0 | 85 | 115 | 0.01 | 0.08 | 98.7 | 62.5 | 140 |
| EXAMPLE 6 | 5010 | POLYMER OF PRODUCTION EXAMPLE 1 | 30 | 4.3 | 81 | 103 | 0.06 | 0.38 | 98.2 | 68.9 | 85 |
| EXAMPLE 7 | 4520 | POLYMER OF PRODUCTION EXAMPLE 1 | 30 | 4.2 | 75 | 98 | 0.11 | 0.68 | 98.2 | 67.4 | 145 |
| EXAMPLE 8 | 4520 | POLYMER OF PRODUCTION EXAMPLE 3 | 30 | 4.1 | 72 | 96 | 0.15 | 0.70 | 98.1 | 66.5 | 140 |
| EXAMPLE 9 | 3510 | POLYMER OF PRODUCTION EXAMPLE 4 | 30 | 4.4 | 76 | 113 | 0.01 | 0.09 | 98.3 | 65.5 | 120 |
| EXAMPLE 10 | 3510 | POLYMER OF PRODUCTION EXAMPLE 1 | 10 | 3.5 | 68 | 92 | 0.22 | 1.25 | 98.4 | 67.7 | 140 |
| EXAMPLE 11 | 3510 | POLYMER OF PRODUCTION EXAMPLE 14 | 30 | 4.3 | 76 | 97 | 0.14 | 0.69 | 98.4 | 65.5 | 145 |
| EXAMPLE 12 | POLYMER OF PRODUCTION EXAMPLE 10 | POLYMER OF PRODUCTION EXAMPLE 9 | 30 | 4.5 | 75 | 98 | 0.12 | 0.65 | 98.5 | 66.6 | 142 |
| EXAMPLE 13 | POLYMER OF PRODUCTION EXAMPLE 10 | POLYMER OF PRODUCTION EXAMPLE 9 | 30 | 4.4 | 74 | 98 | 0.12 | 0.66 | 98.6 | 66.4 | 140 |
| EXAMPLE 14 | POLYMER OF PRODUCTION EXAMPLE 10 | POLYMER OF PRODUCTION EXAMPLE 1 | 30 | 4.3 | 74 | 97 | 0.14 | 0.70 | 98.8 | 64.8 | 145 |

TABLE 2-continued

| | HIGH-MOLECULAR-WEIGHT POLYOXYMETHYLENE RESIN (B) | LOW-MOLECULAR-WEIGHT OXYMETHYLENE POLYMER (A) | | FLEXURAL MODULUS (GPa) | CRYSTAL-LINITY (%) | ROCKWELL HARDNESS (M SCALE) | CHEMICAL RESISTANCE (WEIGHT INCREMENT) (%) | | WELDABILITY | | THERMAL STABILITY (MIN) |
|---|---|---|---|---|---|---|---|---|---|---|---|
| | | TYPE | AMOUNT PER 100 PARTS BY WEIGHT OF (B) (PARTS BY WEIGHT) | | | | ACETONE | CHLOROFORM | ELONGATION RETENTION (%) | STRENGTH RETENTION (%) | |
| EXAMPLE 15 | 2010 | POLYMER OF PRODUCTION EXAMPLE 21 | 44 | 4.5 | 79 | 114 | 0.04 | 0.27 | 98.6 | 65.5 | 80 |
| EXAMPLE 16 | 2010 | POLYMER OF PRODUCTION EXAMPLE 19 | 44 | 4.6 | 82 | 116 | 0.04 | 0.24 | 98.7 | 63.3 | 96 |
| EXAMPLE 17 | 2010 | POLYMER OF PRODUCTION EXAMPLE 21 | 44 | 4.5 | 79 | 116 | 0.03 | 0.17 | 98.5 | 65.7 | 95 |
| EXAMPLE 18 | 2010 | POLYMER OF PRODUCTION EXAMPLE 21 | 44 | 4.4 | 78 | 112 | 0.04 | 0.22 | 98.6 | 65.4 | 93 |
| EXAMPLE 19 | POLYMER OF PRODUCTION EXAMPLE 24 | POLYMER OF PRODUCTION EXAMPLE 22 | 44 | 4.4 | 75 | 118 | 0.03 | 0.25 | 98.7 | 64.6 | 82 |
| EXAMPLE 20 | 3510 | POLYMER OF PRODUCTION EXAMPLE 21 | 44 | 4.3 | 79 | 106 | 0.05 | 0.35 | 98.8 | 64.7 | 135 |
| EXAMPLE 21 | LA541 | POLYMER OF PRODUCTION EXAMPLE 21 | 44 | 4.5 | 75 | 118 | 0.03 | 0.26 | 98.1 | 68.7 | 81 |
| EXAMPLE 22 | POLYMER OF PRODUCTION EXAMPLE 10 | POLYMER OF PRODUCTION EXAMPLE 21 | 30 | 4.6 | 77 | 110 | 0.08 | 0.45 | 98.4 | 66.5 | 141 |
| COMP. EXAMPLE 1 | 4520 | POLYMER OF PRODUCTION EXAMPLE 13 | 30 | 2.9 | 77 | 85 | 0.82 | 3.50 | 94.4 | 57.6 | 80 |
| COMP. EXAMPLE 2 | 4520 | POLYMER OF PRODUCTION EXAMPLE 2 | 30 | 2.6 | 68 | 80 | 0.84 | 3.73 | 97.6 | 64.3 | 140 |
| COMP. EXAMPLE 3 | 4520 | POLYMER OF PRODUCTION EXAMPLE 5 | 30 | 2.9 | 76 | 82 | 1.35 | 4.33 | 78.4 | 43.2 | 70 |
| COMP. EXAMPLE 4 | 3510 | NONE | — | 2.5 | 57 | 80 | 0.83 | 3.53 | 97.5 | 64.6 | 145 |
| COMP. EXAMPLE 5 | 4520 | NONE | — | 2.6 | 58 | 80 | 0.83 | 3.52 | 98.1 | 65.7 | 140 |
| COMP. EXAMPLE 6 | 5010 | NONE | — | 3.1 | 75 | 95 | 0.78 | 2.32 | 98.3 | 65.6 | 42 |
| COMP. EXAMPLE 7 | POLYMER OF PRODUCTION EXAMPLE 7 | NONE | — | 2.3 | 52 | 77 | 0.86 | 3.95 | 97.6 | 66.4 | 130 |
| COMP. EXAMPLE 8 | 3510 | NONE | — | 2.6 | 59 | 80 | 0.85 | 3.62 | 93.5 | 55.6 | 120 |

TABLE 2-continued

| | HIGH-MOLECULAR-WEIGHT POLYOXYMETHYLENE RESIN (B) | LOW-MOLECULAR-WEIGHT OXYMETHYLENE POLYMER (A) | | FLEXURAL MODULUS (GPa) | CRYSTAL-LINITY (%) | ROCKWELL HARDNESS (M SCALE) | CHEMICAL RESISTANCE (WEIGHT INCREMENT) (%) | | WELDABILITY | | THERMAL STABILITY (MIN) |
|---|---|---|---|---|---|---|---|---|---|---|---|
| | | TYPE | AMOUNT PER 100 PARTS BY WEIGHT OF (B) (PARTS BY WEIGHT) | | | | ACETONE | CHLOROFORM | ELONGATION RETENTION (%) | STRENGTH RETENTION (%) | |
| COMP. EXAMPLE 9 | 3510 | POLYMER OF PRODUCTION EXAMPLE 12 | 30 | 1.3 | 52 | 73 | 1.10 | 4.08 | 94.4 | 58.9 | 130 |
| COMP. EXAMPLE 10 | 3510 | POLYMER OF PRODUCTION EXAMPLE 14 | 10 | 2.6 | 62 | 77 | 0.95 | 3.86 | 93.4 | 60.1 | 125 |
| COMP. EXAMPLE 11 | 4520 | NONE | — | 3.5 | — | 81 | 0.84 | 3.60 | 68.2 | 7.4 | 20 |
| COMP. EXAMPLE 12 | POLYMER OF PRODUCTION 10 | NONE | — | 2.7 | 67 | 85 | 0.83 | 3.50 | 98.5 | 64.4 | 135 |
| COMP. EXAMPLE 13 | 2010 | POLYMER OF PRODUCTION EXAMPLE 20 | 44 | 3.6 | 85 | 97 | 0.80 | 2.33 | 92.5 | 52.8 | 54 |
| COMP. EXAMPLE 14 | 2010 | POLYMER OF PRODUCTION EXAMPLE 23 | 44 | 3.3 | 80 | 96 | 0.81 | 2.33 | 98.6 | 63.2 | 71 |

TABLE 3

| | LOW-MOLECULAR-WEIGHT OXYMETHYLENE POLYMER (A) | | HIGH MOLECULAR-WEIGHT OXYMETHYLENE POLYMER (B) | | |
|---|---|---|---|---|---|
| | NUMBER-AVERAGE MOLECULAR WEIGHT (Mn) | MOLECULAR WEIGHT DISTRIBUTION (Mw/Mn) | NUMBER-AVERAGE MOLECULAR WEIGHT (Mn) | MOLECULAR WEIGHT DISTRIBUTION (Mw/Mn) | FLEXURAL MODULUS (GPa) |
| EXAMPLE 23 | 3400 | 1.7 | 82000 | 1.8 | 4.4 |
| EXAMPLE 24 | 3600 | 1.8 | 82000 | 2.0 | 4.5 |
| EXAMPLE 25 | 3400 | 1.7 | 82000 | 1.9 | 4.5 |
| EXAMPLE 26 | 1500 | 2.5 | 106000 | 2.6 | 4.6 |
| EXAMPLE 27 | 1600 | 2.6 | 102000 | 2.7 | 4.6 |

| | CRYSTAL-LINITY (%) | ROCKWELL HARDNESS (M SCALE) | CHEMICAL RESISTANCE (WEIGHT INCREMENT) (%) | | WELDABILITY | | THERMAL STABILITY (MIN) |
|---|---|---|---|---|---|---|---|
| | | | ACETONE | CHLOROFORM | ELONGATION RETENTION (%) | STRENGTH RETENTION (%) | |
| EXAMPLE 23 | 77 | 98 | 0.11 | 0.60 | 97.9 | 65.6 | 145 |
| EXAMPLE 24 | 77 | 99 | 0.13 | 0.62 | 98.4 | 64.6 | 144 |
| EXAMPLE 25 | 72 | 99 | 0.10 | 0.57 | 99.1 | 67.5 | 150 |
| EXAMPLE 26 | 77 | 117 | 0.05 | 0.31 | 98.5 | 64.5 | 87 |
| EXAMPLE 27 | 77 | 118 | 0.04 | 0.27 | 97.8 | 66.5 | 86 |

What is claimed is:

1. A low-molecular-weight oxymethylene polymer having a straight-chain molecular structure, a number-average molecular weight of 1,000 to 8,000 and a molecular weight distribution (Mw/Mn) of 1.0 to 3.0, and containing 0 to 30 mol % of a co-monomer unit.

2. A low-molecular-weight oxymethylene polymer according to claim 1, wherein the content of the co-monomer unit is 0 to 0.8 mol %.

3. A low-molecular-weight oxymethylene polymer according to claim 1, wherein the content of the co-monomer unit and the melting point of the polymer fall in the region defined by DEFG in FIG. 1.

4. A low-molecular-weight oxymethylene polymer according to claim 1, produced by continuous bulk polymerization reaction using as starting materials a monomer or a mixture of a monomer and a co-monomer and a molecular weight modifier in an amount of 0.1 to 1 mole per 1 kg of said monomer or said mixture of a monomer and a co-monomer mixture, and also using as polymerization catalyst a cationic polymerization initiator in an amount of 0.00001 to 0.0001 mole per 1 mole of said starting materials.

5. A polyoxymethylene resin composition comprising (A) 1 to 500 parts by weight of a low-molecular-weight oxymethylene polymer set forth in claim 1, and (B) 100 parts by weight of a high-molecular-weight polyoxymethylene resin having a number-average molecular weight of 15,000 to 1,000,000 and selected from the group consisting of (B-1) oxymethylene homopolymer resin, (B-2) oxymethylene copolymer resin, (B-3) oxymethylene block copolymer resin, and a mixture thereof.

6. A polyoxymethylene resin composition according to claim 5, wherein the content of the low-molecular-weight oxymethylene polymer (A) is 10 to 100 parts by weight.

7. A polyoxymethylene resin composition according to claim 5, wherein the high-molecular-weight polyoxymethylene resin (B) is an oxymethylene copolymer resin (B-2) having a melting point of 167 to 171° C.

8. A polyoxymethylene-resin-composition according to claim 5, containing 1 to 10,000 ppm of a crystal nucleating agent.

9. A process for continuously producing a polyoxymethylene resin composition set forth in claim 5, said process comprising the steps of producing a crude polymer of the low-molecular-weight oxymethylene polymer (A) and a crude polymer of the high-molecular-weight polyoxymethylene resin (B) simultaneously by the separate polymerizers, by using equipment consisting of at least two continuous bulk polymerizers connected in parallel and an extruder disposed successively thereto, blending 100 parts by weight of said crude polymer of high-molecular-weight polyoxymethylene resin (B) and 1 to 500 parts by weight of said crude polymer of low-molecular-weight oxymethylene polymer (A) while deactivating the polymerization catalyst, and continuously and uniformly melting and mixing said crude polymers while conducting a terminal stabilization treatment on said crude polymers by said extruder.

10. A process for continuously producing a polyoxymethylene resin composition set forth in claim 5, which comprises the steps of polymerizing a monomer or a mixture of a monomer and a co-monomer and a molecular weight modifier with a cationic polymerization initiator as polymerization catalyst, by using one or two or more continuous bulk polymerizers connected in series, and further adding to the obtained polymerization product-said monomer or said mixture of a monomer and a co-monomer and said molecular weight modifier in a state not causing deactivation of said cationic initiator so that the amount of the produced low-molecular-weight oxymethylene polymer will become 1 to 500 parts by weight per 100 parts by weight of the high-molecular-weight polyoxymethylene resin.

11. A process for continuously producing a polyoxymethylene resin composition set forth in claim 5, said process comprising the steps of producing a crude polymer of low-molecular-weight oxymethylene polymer (A) and a crude polymer of high-molecular-weight polyoxymethylene resin (B) simultaneously by the separate polymerizers using formaldehyde and a molecular weight modifier as starting materials and also using an onium salt-based polymerization catalyst, by using a series of equipment consisting of at least two slurry polymerizers connected in series or parallel, a terminal stabilizing device and an extruder provided successively thereto, blending 100 parts by weight of said crude polymer of high-molecular-weight polyoxymethylene resin (B) and 1 to 500 parts by weight of said crude polymer of low-molecular-weight oxymethylene polymer (A) while deactivating and removing the polymerization catalyst, blocking the unstable terminal of the molecule of the produced polymer, and continuously conducting uniform melting and mixing by the extruder.

12. Parts of OA equipment, music, image or information devices, communications apparatus, electrical and electronic devices, toys, sporting goods, furniture, housing equipment or automobiles, obtained by molding a polyoxymethylene resin composition set forth in claim 5.

* * * * *